US011395328B2

(12) United States Patent
Park et al.

(10) Patent No.: US 11,395,328 B2
(45) Date of Patent: *Jul. 19, 2022

(54) METHOD AND APPARATUS FOR CONFIGURING MULTIPLE SCHEDULING REQUESTS

(71) Applicant: Samsung Electronics Co., Ltd., Gyeonggi-do (KR)

(72) Inventors: Suyoung Park, Gyeonggi-do (KR); Suha Yoon, Gyeonggi-do (KR); Euichang Jung, Seoul (KR); Sunghyuk Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/887,452

(22) Filed: May 29, 2020

(65) Prior Publication Data

US 2020/0296760 A1 Sep. 17, 2020

Related U.S. Application Data

(63) Continuation of application No. 16/031,578, filed on Jul. 10, 2018, now Pat. No. 10,674,532.

(30) Foreign Application Priority Data

Jul. 10, 2017 (KR) .......................... 10-2017-0087068

(51) Int. Cl.
*H04W 72/14* (2009.01)
*H04W 72/12* (2009.01)
*H04W 48/12* (2009.01)

(52) U.S. Cl.
CPC .......... *H04W 72/14* (2013.01); *H04W 48/12* (2013.01); *H04W 72/1226* (2013.01); *H04W 72/1268* (2013.01); *H04W 72/1284* (2013.01)

(58) Field of Classification Search
None
See application file for complete search history.

(56) References Cited

U.S. PATENT DOCUMENTS 9,526,095 B2    12/2016 Worrall
10,674,532 B2*  6/2020 Park .................. H04W 72/1226
(Continued)

OTHER PUBLICATIONS

Ericsson, E-mail discussion report [97#62] SR/BSR Enhancements, 3GPP TSG-RAN WG2 #97bis, R2-1702667, Apr. 3-7, 2017, pp. 1-13.

(Continued)

*Primary Examiner* — Anh Vu H Ly
(74) *Attorney, Agent, or Firm* — The Farrell Law Firm, P.C.

(57) ABSTRACT

A method of a terminal in a mobile communication system includes receiving, from a base station, information including scheduling request (SR) configurations and an allowed subcarrier spacing (SCS) corresponding to a first logical channel and SR configurations and an allowed SCS corresponding to a second logical channel; transmitting, to the base station, an SR based on the SR configurations corresponding to the first logical channel or the SR configurations corresponding to the second logical channel; receiving an uplink grant in response to the SR from the base station; identifying an SCS associated with a bandwidth part (BWP) including the uplink grant; and selecting logical channels between the first logical channel and the second logical channel such that the identified SCS associated with the BWP is matched to the allowed SCS included in the information.

16 Claims, 18 Drawing Sheets

(56) References Cited

U.S. PATENT DOCUMENTS

| | | |
|---|---|---|
| 2017/0085360 A1 | 3/2017 | Lee et al. |
| 2017/0142749 A1 | 5/2017 | Kim |
| 2018/0049227 A1 | 2/2018 | Moon |
| 2018/0249513 A1 | 8/2018 | Chang |
| 2018/0270699 A1* | 9/2018 | Babaei ............ H04W 72/1284 |
| 2018/0279331 A1 | 9/2018 | Shaheen |
| 2018/0279353 A1* | 9/2018 | Shaheen ............ H04W 72/042 |
| 2018/0310308 A1 | 10/2018 | Loehr |
| 2018/0317123 A1 | 11/2018 | Chen |
| 2018/0324635 A1 | 11/2018 | Babei |
| 2018/0324768 A1 | 11/2018 | Shaheen |
| 2018/0324832 A1 | 11/2018 | He |
| 2018/0324844 A1 | 11/2018 | Babaei |
| 2018/0324867 A1 | 11/2018 | Basu |
| 2018/0324872 A1 | 11/2018 | Babaei |
| 2018/0359766 A1 | 12/2018 | Shih |
| 2018/0359773 A1 | 12/2018 | Tesanovic |
| 2018/0368156 A1 | 12/2018 | Agiwal |
| 2018/0368173 A1 | 12/2018 | Shaheen |
| 2019/0035579 A1 | 1/2019 | Pisu |
| 2019/0075579 A1 | 3/2019 | Wang |
| 2019/0132856 A1 | 5/2019 | Moon |
| 2019/0335451 A1 | 10/2019 | Yang |
| 2019/0342902 A1 | 11/2019 | Wu |
| 2019/0387578 A1* | 12/2019 | Shrestha ............... H04W 72/14 |

OTHER PUBLICATIONS

Samsung, UL Scheduling Issues for Latency Reduction in NR, 3GPP TSG RAN WG2 #97, R2-1701993, Feb. 13-17, 2017, pp. 1-4.

Huawei, HiSilicon, "SR Enhancements with Multiple Numerologies", R2-1705625, 3GPP TSG-RAN2 Meeting #98, May 15-19, 2017, 4 pages.

Nokia et al., "Discussion on Multiple SR Configuration", R1-1710992, 3GPP TSG-RAN WG1 NR#2, Jun. 27-30, 2017, 3 pages.

Korean Office Action dated Oct. 27, 2021 issued in counterpart application No. 10-2017-0087068, 8 pages.

* cited by examiner

FIG. 9
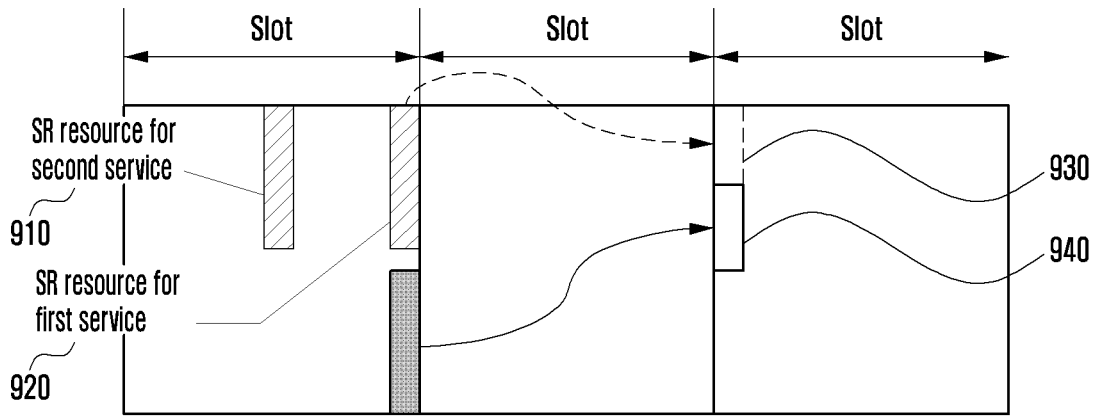
(a)
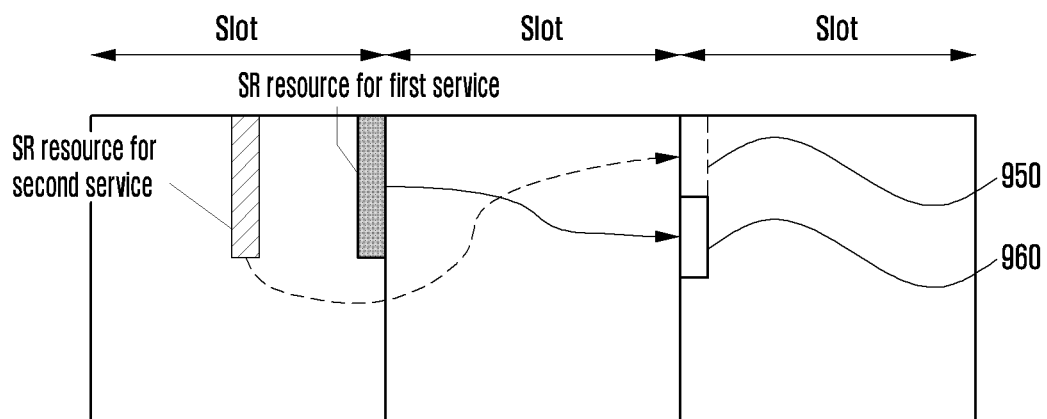
(b)
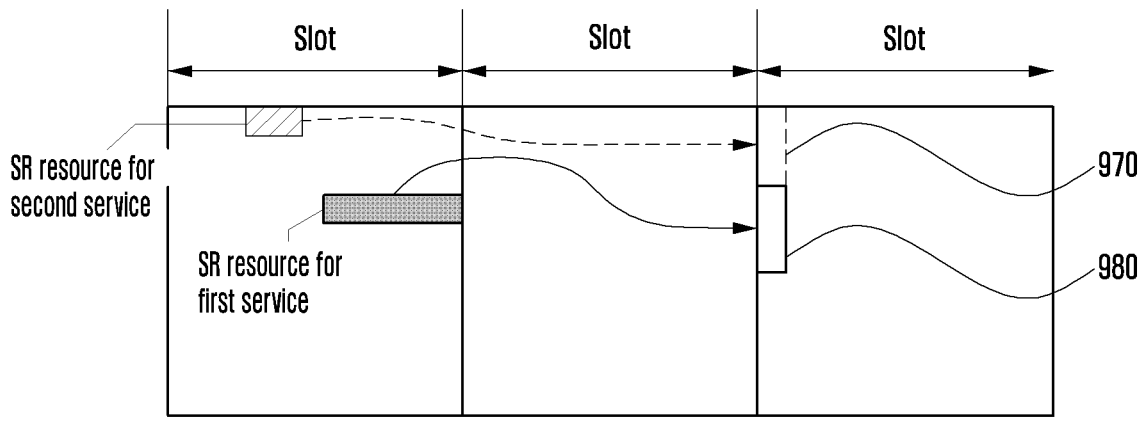
(c)

FIG. 10
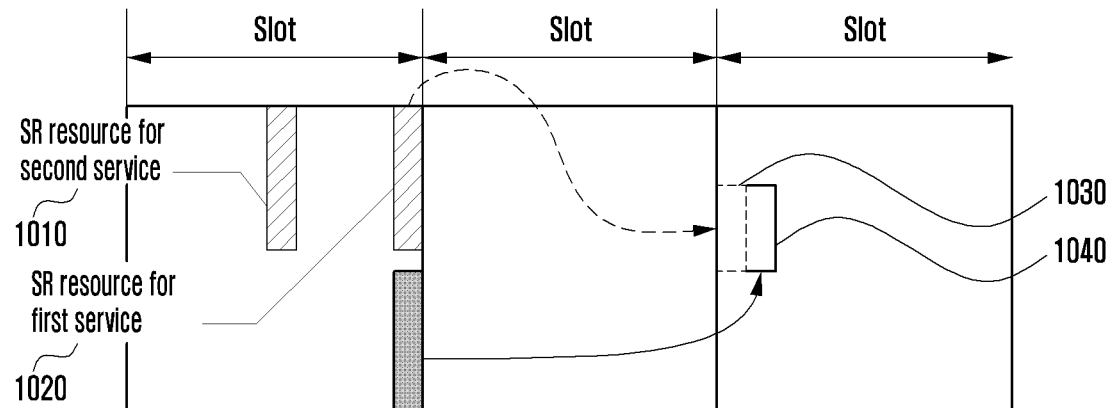
(a)
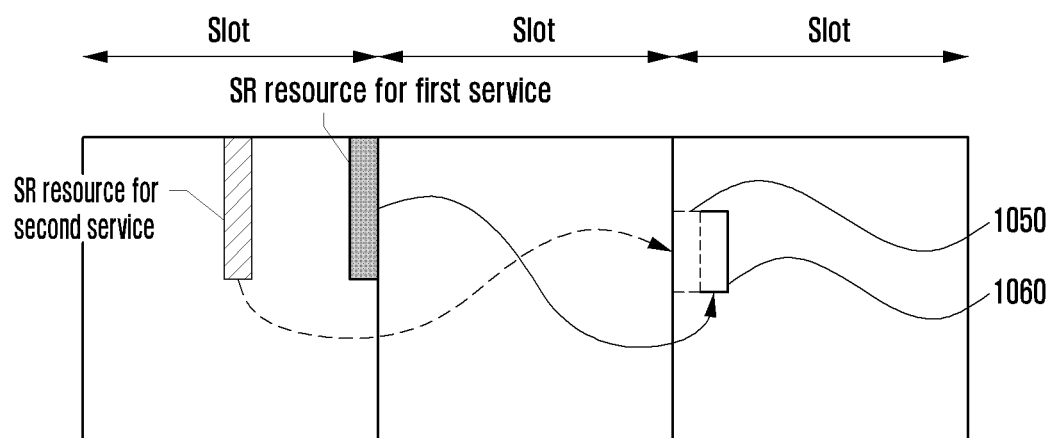
(b)
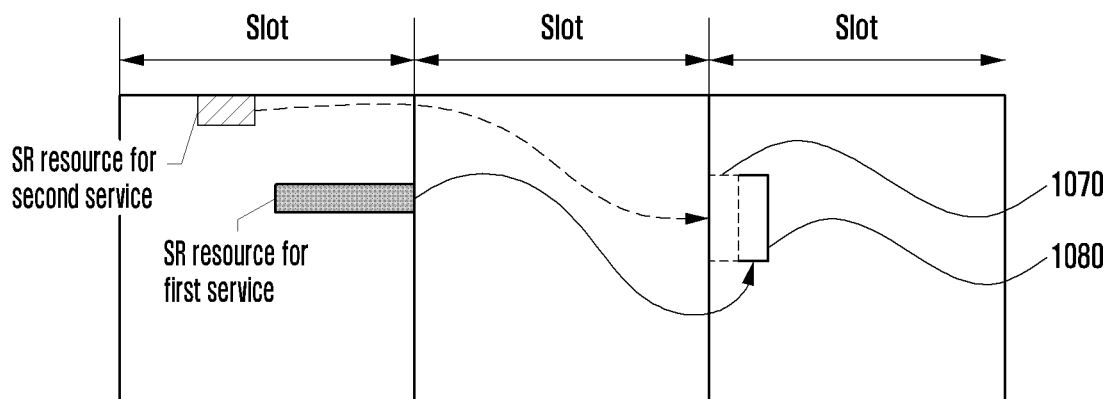
(c)

FIG. 11
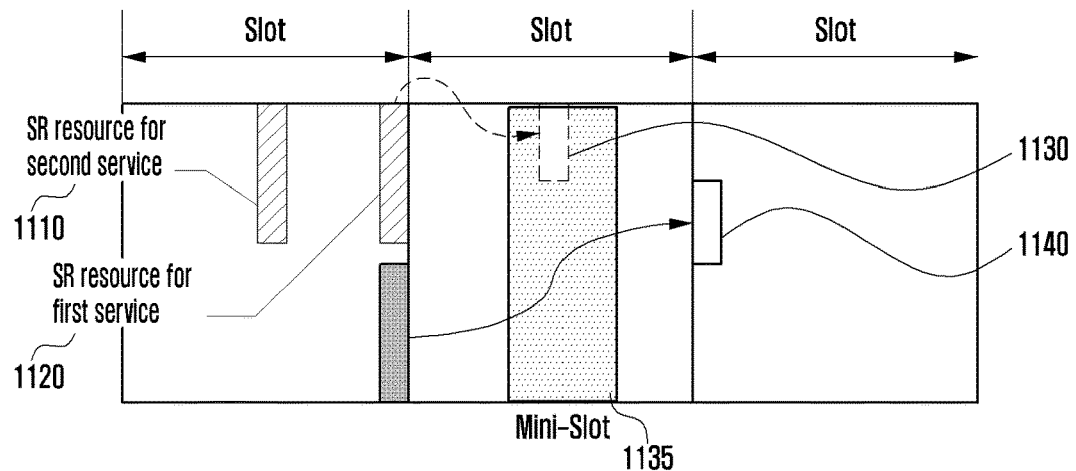
(a)
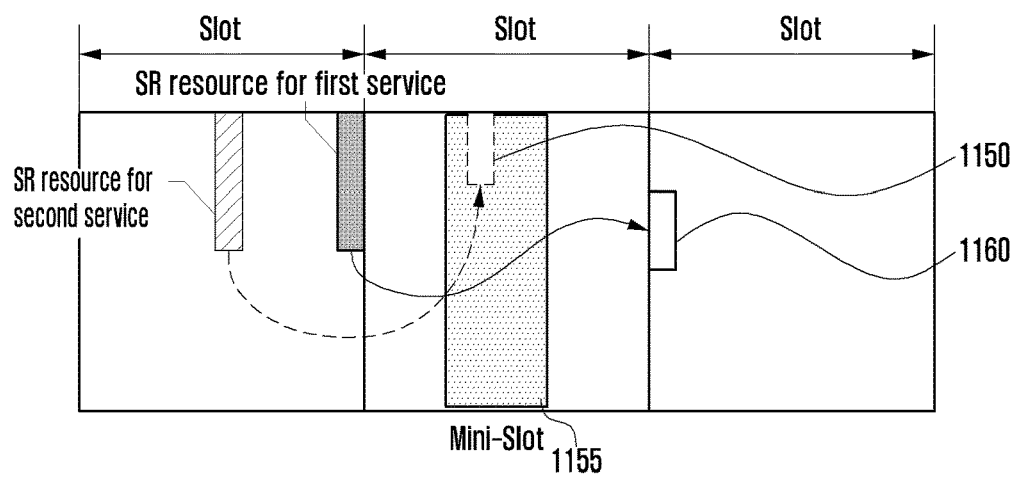
(b)
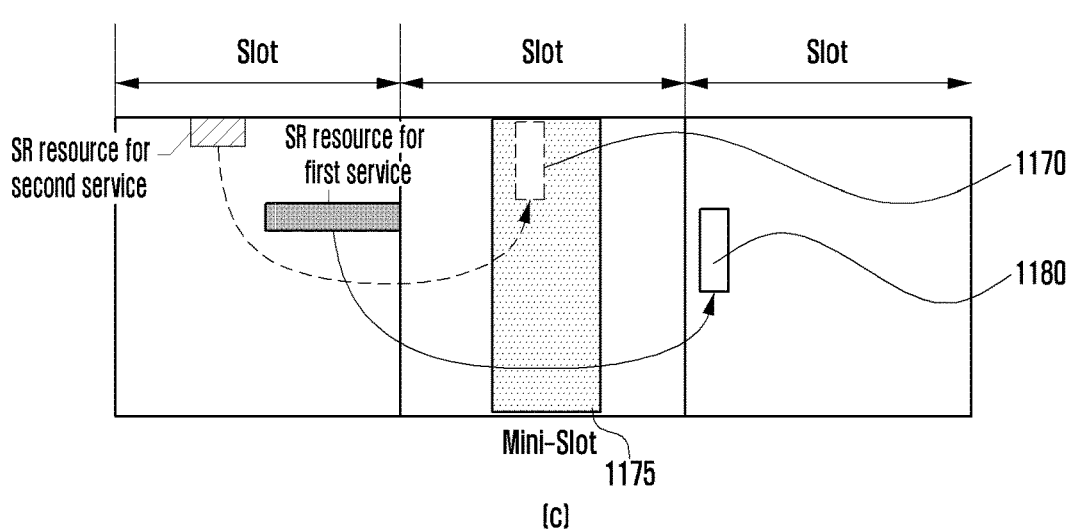
(c)

FIG. 14
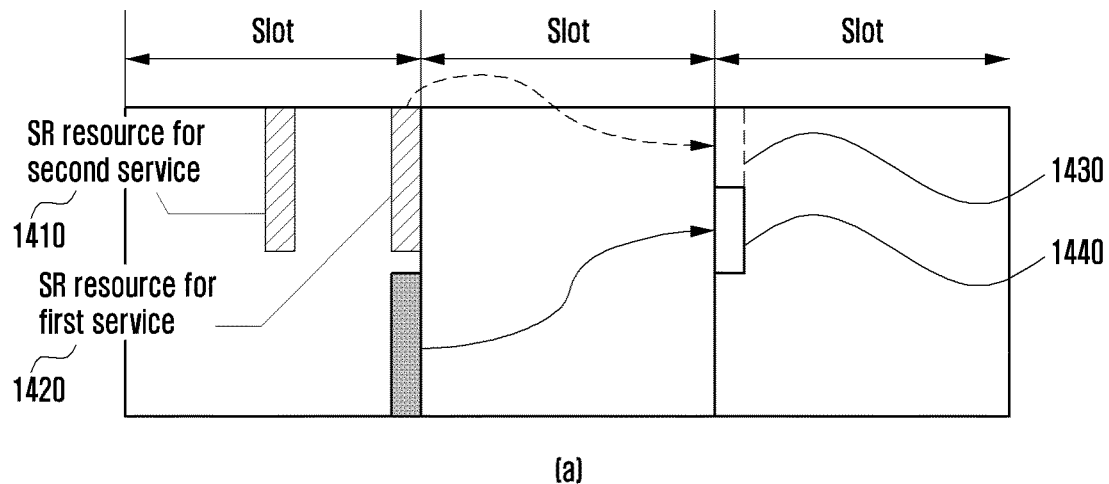
(a)
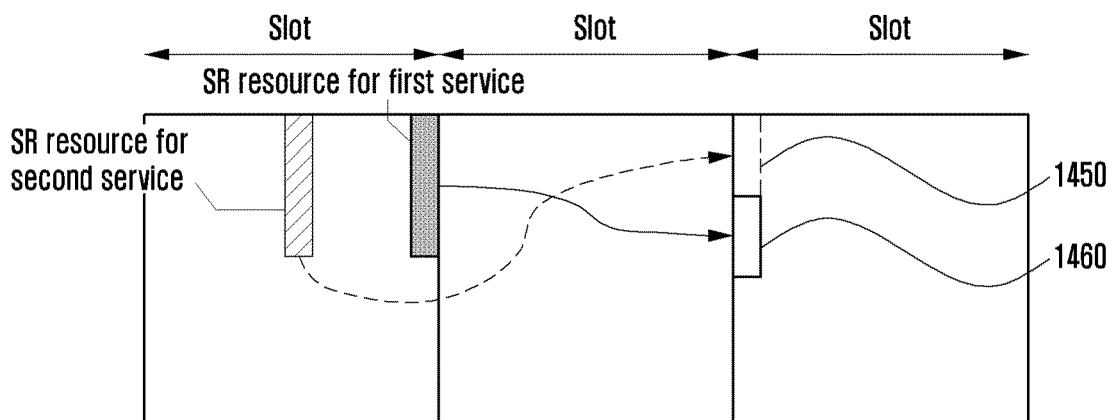
(b)
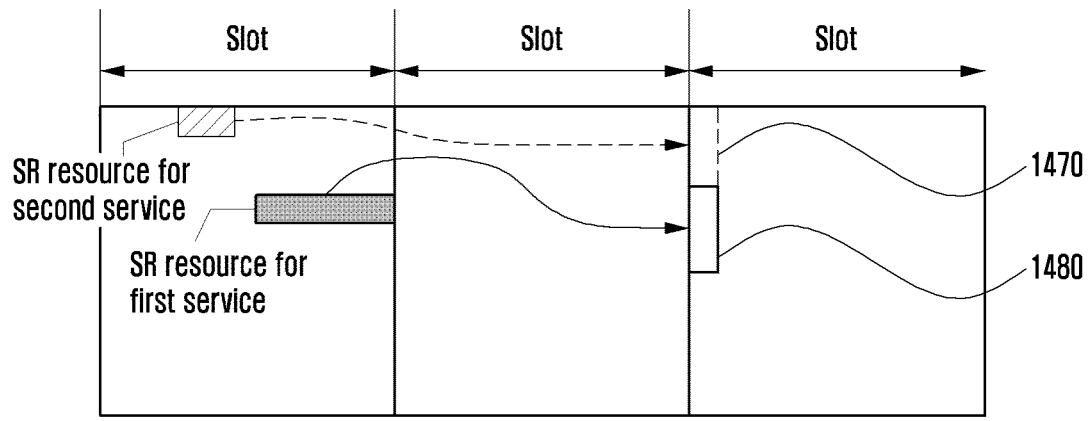
(c)

FIG. 15
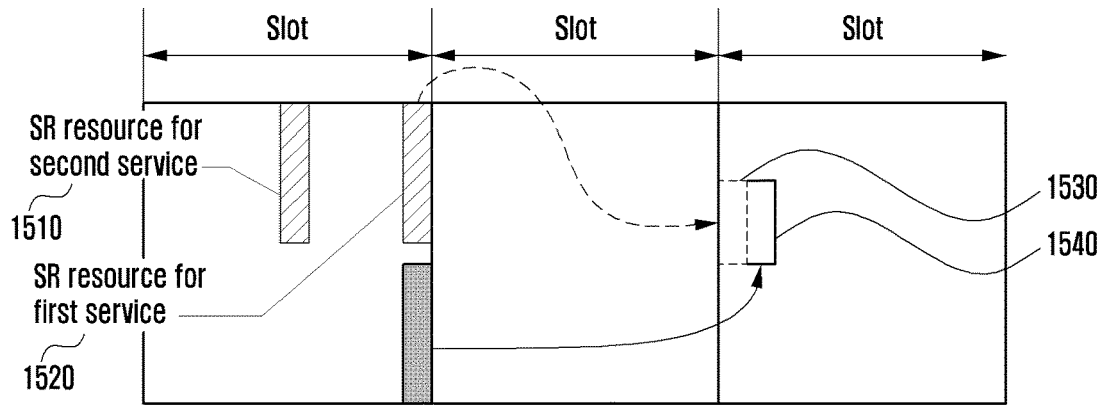
(a)
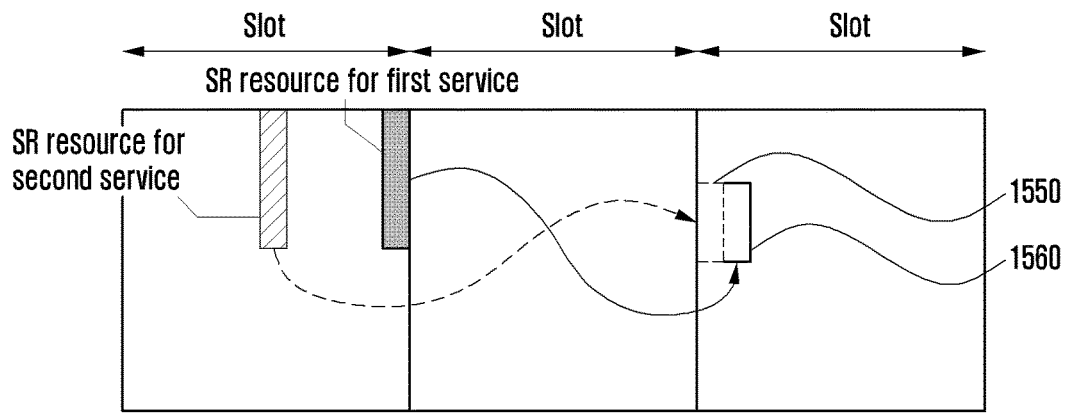
(b)
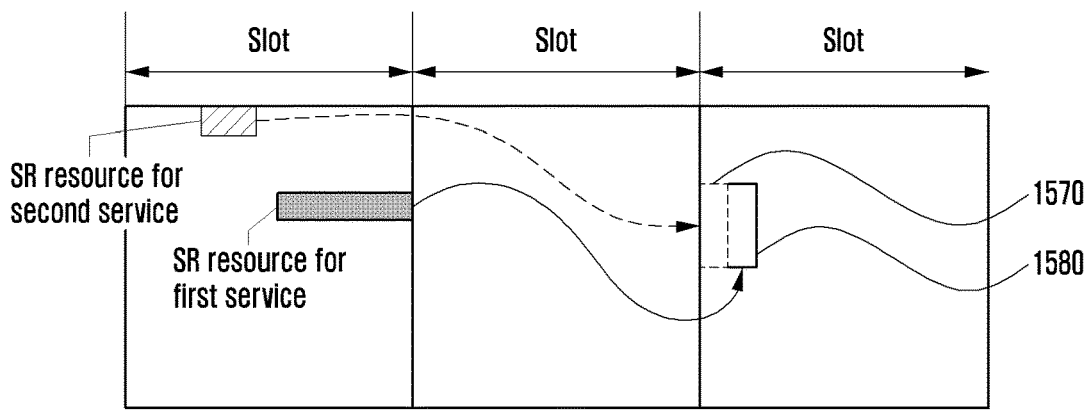
(c)

FIG. 16
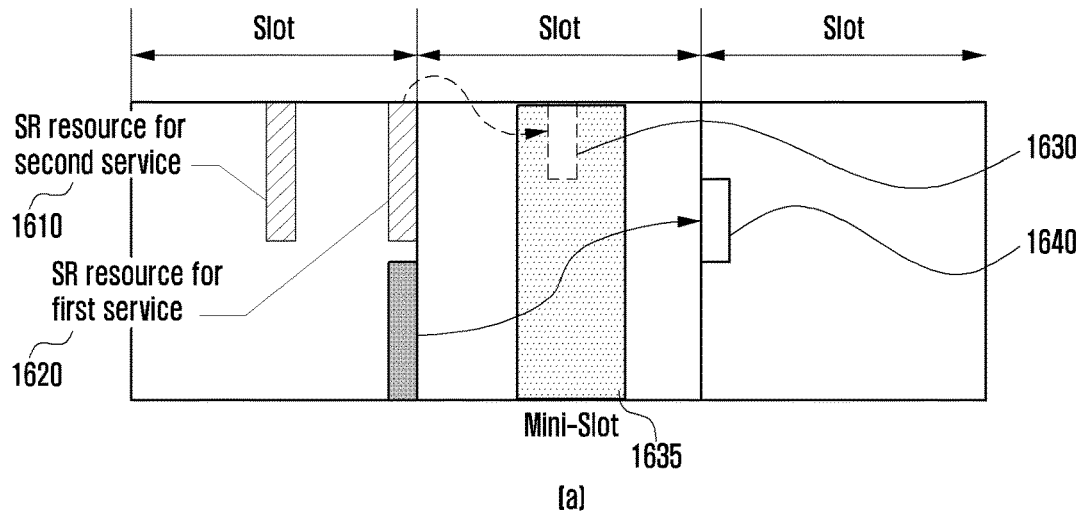
(a)
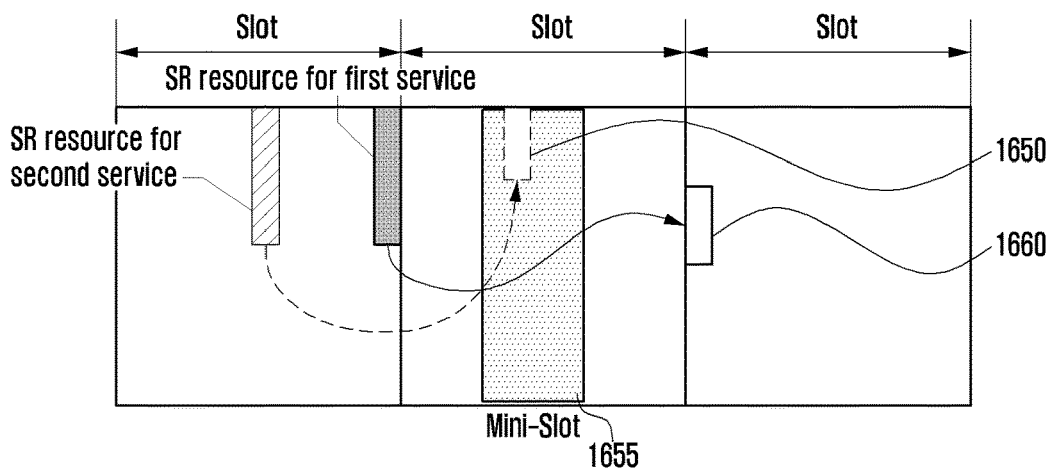
(b)
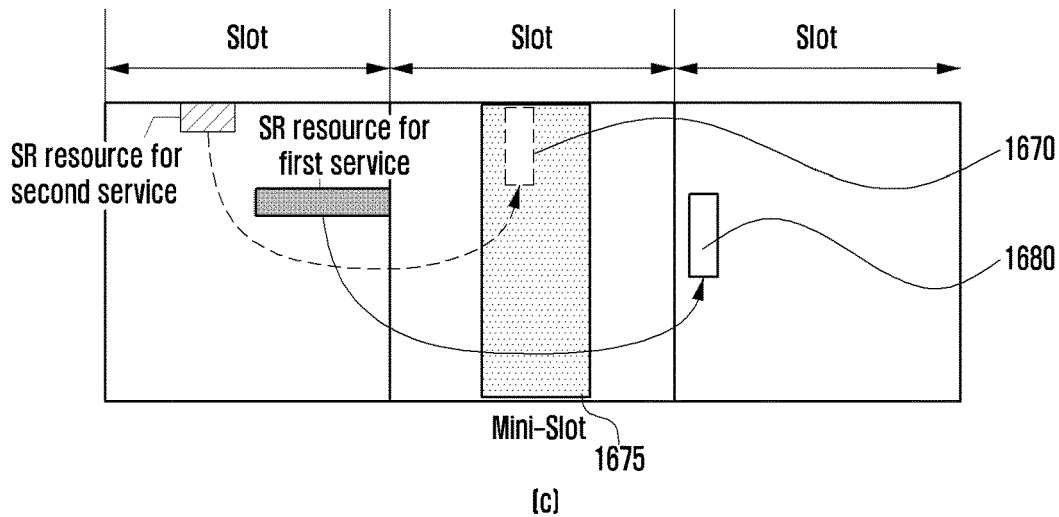
(c)

METHOD AND APPARATUS FOR CONFIGURING MULTIPLE SCHEDULING REQUESTS

CROSS-REFERENCE TO RELATED APPLICATION

This application is a Continuation Application of U.S. application Ser. No. 16/031,578, filed on Jul. 10, 2018, which is based on and claims priority under 35 U.S.C. § 119(a) to Korean Patent Application Serial No. 10-2017-0087068, filed on Jul. 10, 2017, in the Korean Intellectual Property Office, the entire disclosure of which is incorporated herein by reference.

BACKGROUND

1. Field

The present disclosure relates, generally, to $5^{th}$ generation (5G) wireless communication (or next generation wireless communication), and more particularly to a wireless communication system supporting various services such as enhanced mobile broadband (eMBB), ultra-reliable and low-latency communications (URLLC), and massive machine type communications (mMTC) services.

2. Description of the Related Art

To meet the demand for wireless data traffic having increased since deployment of $4^{th}$ generation (4G) communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

Meanwhile, LTE and 5G systems operate based on orthogonal frequency division multiplexing (OFDM). LTE uses a fixed subcarrier spacing of 15 kHz while 5G employs multiple numerologies (subcarrier spacings) of 5 kHZ, 15 kHz, 30 kHz, 60 kHz, 120 kHz, etc. to support various types of services (e.g., eMBB, URLLC, and mMTC services) in various frequency bands (e.g., sub-6 GHz and above-6 GHz bands). Furthermore, multiple numerologies may be time-division multiplexed (TDM) or frequency-division multiplexed (FDM) on one carrier. In comparison with LTE, assuming a maximum bandwidth of 20 MHz of one component carrier (CC), 5G requires a maximum bandwidth of over 1 GHz.

The 5G services (e.g., eMBB, URLLC, and mMTC services) may require different quality of service (QoS) levels. The eMBB services may require a high data rate and a reasonable level of latency. Some eMBB services may require a latency lower than a predetermined level, and the URLLC services may require a latency lower than a predetermined level. Also, a service may require a predetermined latency of 0.5 ms. The mMTC services may have a critical requirement related to battery consumption. In order to meet such requirements, it may be necessary to reduce signaling overhead.

SUMMARY

The present disclosure has been made to address at least the disadvantages described above and to provide at least the advantages described below.

Accordingly, an aspect of the present disclosure provides a method and apparatus for configuring multiple scheduling requests (SR) that are capable of improving communication efficiency of a terminal and protecting against the terminal malfunctioning.

An aspect of the present disclosure provides a method and apparatus for configuring a multi-bit SR that is capable of improving communication efficiency of a terminal and protecting against malfunction of the terminal.

In accordance with an aspect of the present disclosure, there is provided a method of a terminal in a mobile communication system. The method includes transmitting to a base station an SR for a first service or a second service based on SR configurations for the first and second services; receiving an uplink grant in response to the SR from the base station; transmitting, to the base station, uplink data of the first or second service based on the SR configurations for the first and second services and the uplink grant.

In accordance with another aspect of the present disclosure, there is provided a terminal of a mobile communication system. The terminal includes a transceiver configured to transmit and receive a signal and a controller configured to control transmission to a base station of an SR for a first service or a second service based on SR configurations for the first and second services; receive an uplink grant in response to the SR from the base station; and transmit, to the base station, uplink data of the first or second service based on the SR configurations for the first and second services and the uplink grant.

In accordance with another aspect of the present disclosure, there is provided a method of a base station in a mobile communication system. The method includes receiving an SR for a first service or a second service based on SR configurations for the first and second services from a terminal, transmitting to the terminal an uplink grant for the first or second service in response to the SR, and receiving uplink data of the first or second service from the terminal based on the SR configurations for the first and second services and the transmitted uplink grant.

In accordance with another aspect of the present disclosure, there is provided a base station of a mobile communication system. The base station includes a transceiver configured to transmit and receive a signal and a controller configured to control reception of an SR for a first service or a second service based on SR configurations for the first and second services from a terminal, transmit to the terminal an uplink grant for the first or second service in response to the SR, and receive uplink data of the first or second service from the terminal based on the SR configurations for the first and second services and the transmitted uplink grant.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 9 is a diagram illustrating an uplink (UL) grant resource configuration method, according to an embodiment;

FIG. 10 is a diagram illustrating a UL grant resource configuration method, according to an embodiment;

FIG. 11 is a diagram illustrating a UL grant resource configuration method, according to an embodiment;

FIG. 14 is a diagram illustrating a UL grant resource configuration method, according to an embodiment;

FIG. 15 is a diagram illustrating a UL grant resource configuration method, according to an embodiment;

FIG. 16 is a diagram illustrating a UL grant resource configuration method, according to an embodiment;

DETAILED DESCRIPTION

Figure 1:
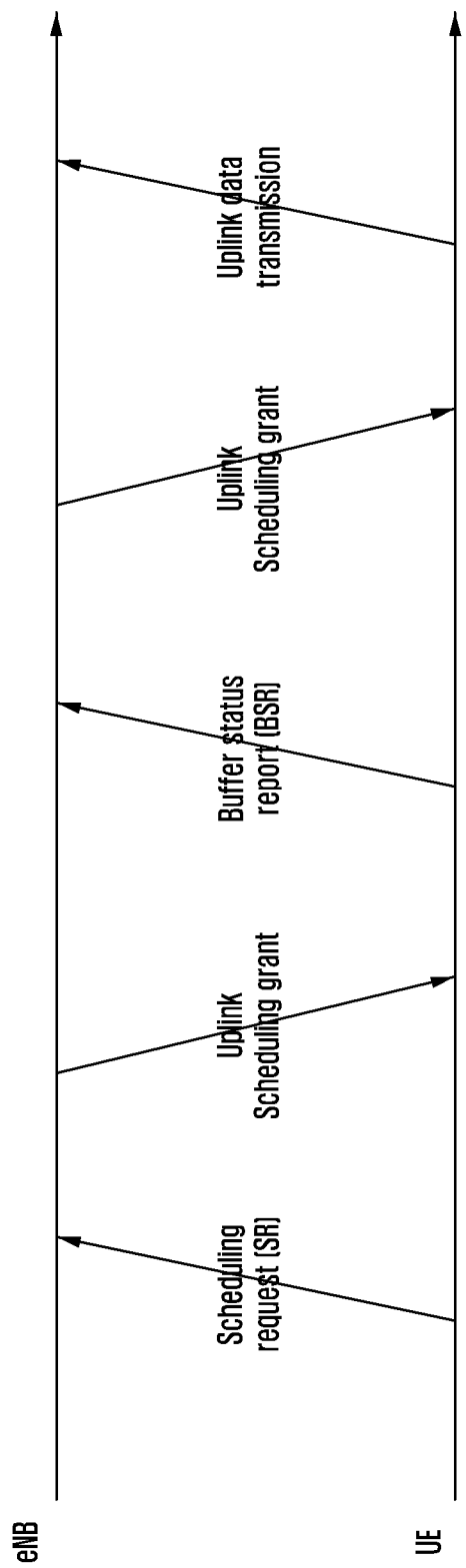
FIG. 1 is a diagram illustrating an uplink transmission procedure in an LTE system.

Embodiments of the present disclosure will be described herein below with reference to the accompanying drawings. The same reference numbers are used throughout the drawings to refer to the same or like parts.

Detailed descriptions of technical specifications that are well-known in the art and unrelated directly to the present disclosure may be omitted to avoid obscuring the subject matter of the present disclosure.

Some elements may be exaggerated, omitted, or simplified in the drawings and, in practice, the elements may have sizes and/or shapes different from those shown in the drawings.

The present disclosure may be embodied in many different forms and should not be construed as being limited to the embodiments set forth herein.

It will be understood that each block of the flowcharts and/or block diagrams, and combinations of blocks in the flowcharts and/or block diagrams, can be implemented by computer program commands which are stored as computer program instructions. These computer program instructions may be provided to a processor of a general-purpose computer, special purpose computer, or other programmable data processing apparatus, such that the instructions that are executed as commands via the processor of the computer or other programmable data processing apparatus create a means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the commands that are executed on the computer or other programmable apparatus provide steps for implementing the functions/acts specified in the flowcharts and/or block diagrams.

Furthermore, block diagrams may illustrate parts of modules, segments, or codes including at least one or more executable commands for performing specific logic function (s). Moreover, it should be noted that the functions of the blocks may be performed in a different order in several modifications. For example, two successive blocks may be performed substantially at the same time, or may be performed in reverse order according to their functions.

According to embodiments of the present disclosure, the term "module", means, but is not limited to, a software or hardware component, such as a field programmable gate array (FPGA) or application specific integrated circuit (ASIC), which performs certain tasks. A module may advantageously be configured to reside on an addressable storage medium and configured to be executed on one or more processors. Thus, a module may include components such as software components, object-oriented software components, class components and task components, processes, functions, attributes, procedures, subroutines, segments of program code, drivers, firmware, microcode, circuitry, data, databases, data structures, tables, arrays, and variables. The functionality provided by the components and modules may be combined into fewer components and modules or further separated into additional components and modules. In addition, the components and modules may be implemented such that they execute by one or more central processing units (CPUs) in a device or a secure multimedia card.

FIG. 1 is a diagram illustrating an uplink transmission procedure in an LTE system The LTE system employs an SCS of 15 kHz. In the LTE system, a radio frame consists of 10 subframes, each subframe consists of 2 slots, and each slot consists of 7 symbols. In the time domain, a resource block (RB) consists of 12 subcarriers of 15 kHz each. The LTE system supports scalable carrier bandwidths that are determined by a number of RBs in a carrier; for example, an LTE carrier may consist of 100 RBs for an LTE system with a bandwidth of 20 MHz and 50 RBs for an LTE system with a bandwidth of 10 MHz.

In a 5G system, different radio resources with different SCSs may be multiplexed using frequency division multiplexing (FDM) or time division multiplexing (TDM). Unlike the LTE system, which uses a subframe as a basic unit of scheduling, the 5G system uses a slot composed of 7 or 14 symbols as a basic unit of scheduling. The slot, as the basic unit of scheduling in the 5G system, may vary in length according to the SCS, whereas the subframe as the basic unit of scheduling in the LTE system is fixed in length to 1 ms. Therefore, there is a need to define a new method for transmitting a physical random access channel (PRACH) in the 5G system.

In the LTE system, if data is to be transmitted in an uplink (UL), a terminal (e.g., a user equipment (UE)) may send an SR to its serving evolved node B (eNB) or perform a random access channel (RACH) procedure with the eNB. FIG. 1 depicts a procedure for a UE to send an SR to notify the eNB of the presence of uplink data to be transmitted. The LTE system employs an ON/OFF keying (OOK) scheme-based SR mechanism, with which transmission of supplementary information necessary for UL transmission to the eNB is not allowed. In this respect, the eNB allocates just as many resources as are needed for the UE to transmit a buffer status report (BSR) upon receipt of an SR and, if the BSR is received, allocates further resources for UL transmission of the UE. This procedure may introduce a delay in uplink data transmission of the UE.

Figure 2:
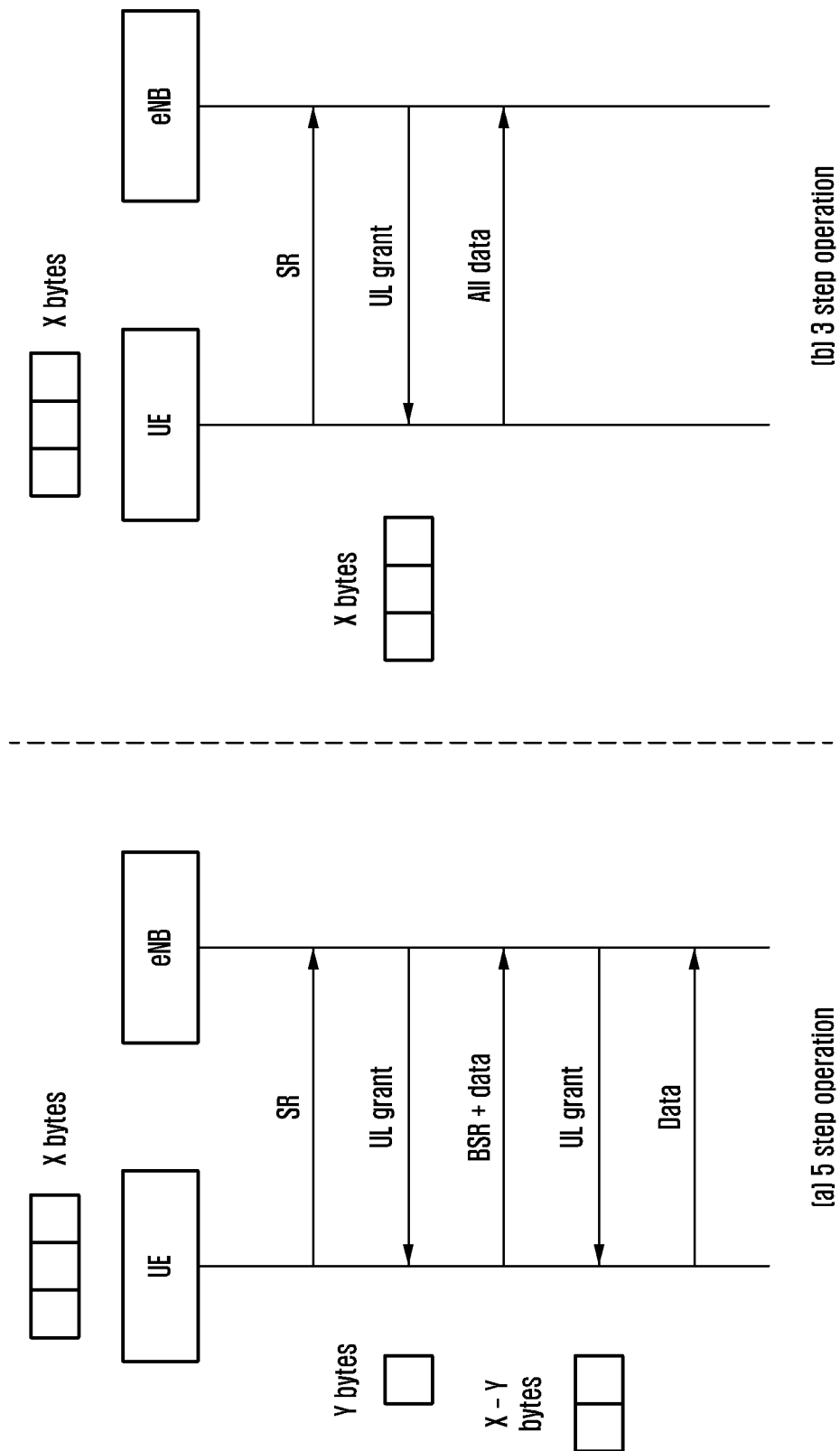
FIG. 2 is a diagram illustrating contention-free SR transmission procedures similar to that employed in the LTE system.

FIG. 2 is a diagram illustrating contention-free SR transmission procedures similar to that employed in the LTE system.

Several SR transmission schemes have been proposed for use in next generation systems, and FIG. 2 exemplifies some of them. Parts (a) and (b) of FIG. 2 depict contention-free SR transmission schemes that are similar to that employed in the LTE system. Part (a) of FIG. 2 is directed to a 5-step operation similar to the operation system employed in the LTE system, and part (b) of FIG. 2 is directed to a simplified 3-step operation.

Figure 3:
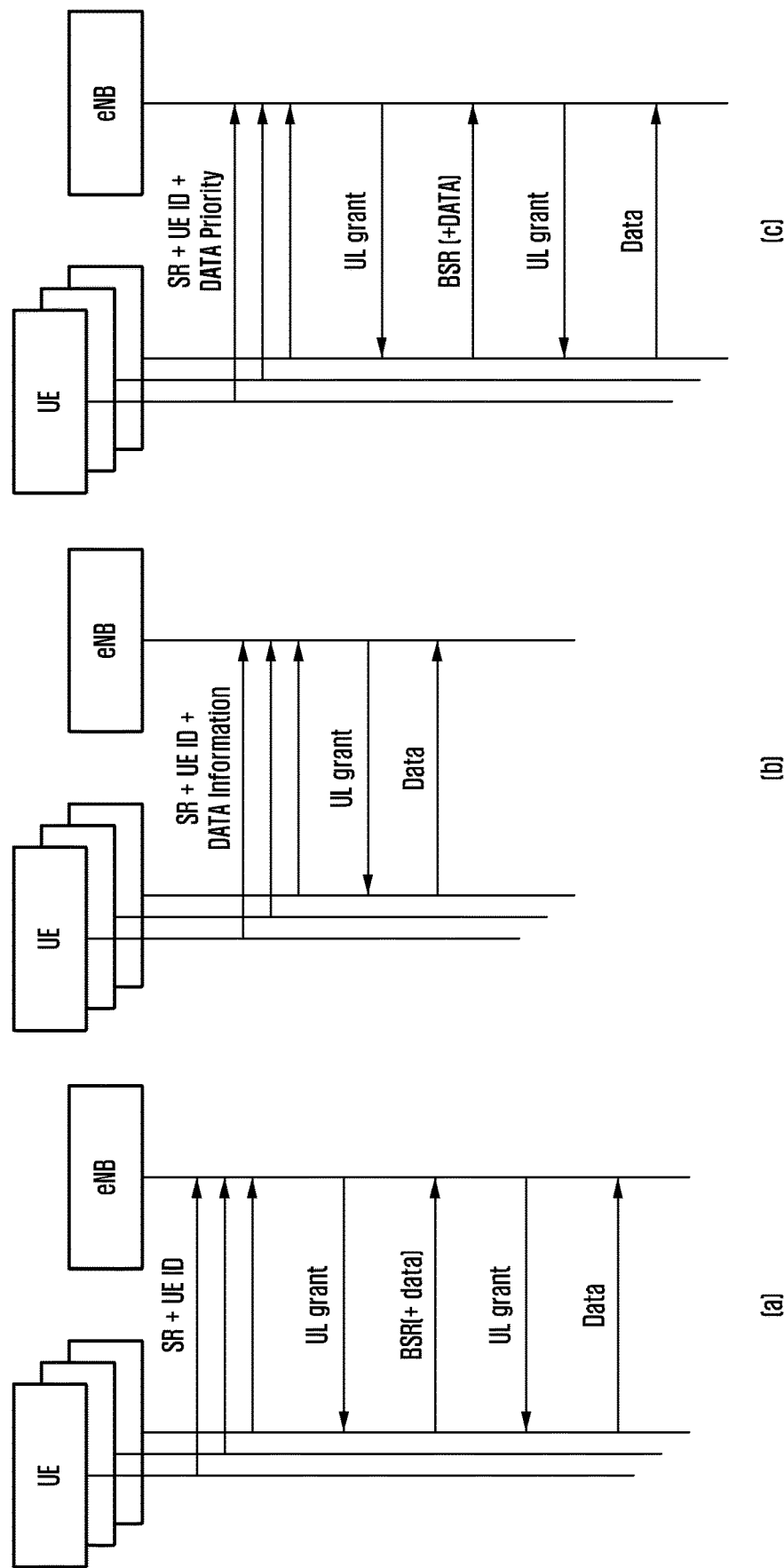
FIG. 3 is a diagram illustrating contention-based SR transmission procedures based on non-orthogonal multiple access (NOMA)

FIG. 3 is a diagram illustrating contention-based SR transmission procedures based on NOMA. The contention-based SR transmission procedures exemplified in parts (a), (b), and (c) of FIG. 3 are designed in consideration of transmitting supplementary information along with the SR. For example, the SR may be configured to include only a UE identification (ID) as shown in part (a) of FIG. 3, a UE ID and data amount information as shown in part (b) of FIG. 3, or a UE ID, data amount information, and priority of data as shown in part (c) of FIG. 3.

Additionally, a hybrid scheme of a contention-free scheme and a contention-based scheme may be considered. For example, it may be possible to configure resources to have a contention-based SR transmission resources region and a contention-free SR transmission region.

Descriptions are made hereinafter of the multi-bit SR and multiple SR configuration methods of the present disclosure with reference to FIGS. 4 to 16. First, the multi-bit (or multiple-bit) SR is described.

According to an embodiment, a UE may send an eNB an SR including supplementary information necessary for use in UL data transmission, which is not allowed in LTE. The supplementary information may include various parameters necessary for use in UL transmission, such as data-related parameters (e.g., a UL preferred numerology, a data priority, a latency threshold, and a data amount) and UE-related parameters (e.g., a UE ID and a service ID).

By allowing the UE to transmit the supplementary information to the eNB using at least one extra bit in the SR, it is possible to improve the procedural efficiency of UL transmission scheduling.

A description is made hereinafter of the multiple SR configuration. As described above, the 5G system is capable of providing the UEs with various services such as eMBB, URLLC, and mMTC. The service-specific logical channels may have different requirements in terms of numerology, transmission time interval (TTI), and required latency; and thus may be identified based on the numerology, TTI, and/or required latency. The SR configuration information transmitted through higher layer signaling may include at least one of service identification information for identifying the services (or numerologies/TTIs) (e.g., eMBB, URLLC, and mMTC), information for use in identifying numerologies/TTIs for UL data associated with the SR, information related to quality of service (QoS) of logical channels associated with the SR, and information for use in determining services (or numerologies/TTIs) that cannot be transmitted on the UL resources associated with the SR.

The multiple SR configuration is a technique for configuring one or more SRs for QoSs of various services in such a way of configuration SR resources according to service (or numerology/TTI). For example, the SR resources may be assigned in a service-specific manner so as to be differentiated in the time domain, in the frequency domain, or in both the time and frequency domains. It may also be possible to configure the SR resources additionally for providing the UE with a low latency service. For example, the additional SR resource may be configured to be identical, in the frequency domain or time domain, with other SR resources.

If the UE transmits the multiple SRs according to such a multiple SR configuration, this may cause an ambiguity problem in receiving UL grants via downlink control information (DCI) of a physical downlink control channel (PDCCH) transmitted by the eNB. In order to overcome this problem, there is a need for a method for a UE to distinguish, when it receives multiple UL grants in response to the multiple SRs, between the UL grants in a service-specific (or numerology-specific) manner.

Descriptions are made of the multiple SR configuration and UL grant identification methods with reference to FIGS. 4 to 16. A framework that can be considered in the 5G communication system will first be discussed.

A time division duplex (TDD) will first be described. A semi-static or dynamic TTD scheme is considered for use in the 5G communication system. In this case, downlink (DL) data and control signal transmission, and UL data and control signal transmission are separated in time on a same frequency resource. Time resources are divided into slots, subframes, and/or frames. For example, a slot may be configured to carry at least one of a DL control signal, DL data, a GAP duration, UL data, and a UL control signal. Additionally or alternatively, there may be a slot carrying at least one of the UL data and UL control signal. Further, there may be a slot carrying at least one of the DL control signal, UL, data, and UL control signal. It may also be possible to configure a TDD region for dominantly transmitting at least one of the DL data and DL control signal. It may also be possible to configure a TDD region for dominantly transmitting at least one of the UL data and DL control signal.

An SR for a specific service (first service) may be transmitted only in a slot configured for transmitting at least one of the UL control signal or UL data. For example, the first service may be one of the eMBB, URLLC, and mMTC services. An SR for a second service may be transmitted only in a slot configured for transmitting at least one of the UL control signal or UL data.

According to an embodiment, the second service may be one of the eMBB, URLLC, and mMTC services. Here, the SR for the second service may be transmitted only in a slot comprising a resource for at least one of the UL control signal or UL data of the first service. If transmission timing of the SR for the second service falls in a slot without resources configured for UL data or UL control signal transmission for the first service, the SR transmission may be delayed until a slot with the resources for UL data or UL control signal transmission becomes available.

According to an embodiment, the second service may be one of the eMBB, URLLC, and mMTC services. Here, the SR for the second service may be transmitted only in a slot with a mini-slot configured for the second service. If the transmission timing of the SR for the second service falls in a slot without any mini-slot configured for the second service, the SR transmission may be delayed until a slot with a mini-slot configured for the second service becomes available. The mini-slot may be configured through higher layer signaling or in a dynamic manner.

Frequency division duplex (FDD) will now be described. An FDD scheme is considered for use in the 5G communication system. In this case, the DL data and control signal transmission, and UL, data and control signal transmission are separated in frequency. The time resources are divided into slots, subframes, and/or frames. For example, a slot may carry at least one of UL data and a UL control signal. Additionally or alternatively, a slot may be configured to carry at least one of a DL control signal, UL data, and a UL control signal.

The SR for the first service may be transmitted only in the slot with the resources configured for at least one of the UL control signal or UL data. For example, the first service may be one of eMBB, URLLC, and mMTC services. The SR for the second service may be transmitted only in the slot with the resources configured for at least one of the UL control signal and UL data.

According to an embodiment, the second service may be one of the eMBB, URLLC, and mMTC services. If the transmission timing of the SR for the second service falls in a slot without any mini-slot configured for the second service, the SR transmission may be delayed until a slot with a mini-slot configured for the second service becomes available. The mini-slot may be configured through higher layer signaling or in a dynamic manner.

Hereinafter, a description is made of the procedure for configuring multiple SRs to a terminal according to the QoSs of the various services in the next generation communication system supporting the above-described framework.

According to an embodiment, the SR resources may be configured per service (or numerology/TTI). That is, different SR resources may be configured for different services (or numerology/TTI). The base station may configure the service-specific SR resources by transmitting a higher layer message (e.g., radio resource control (RRC) configuration message). It may also be possible to configure multiple SR resources by transmitting the higher layer message per service or one higher layer message in a collective manner.

The terminal may transmit an SR signal on the allocated SR resources in an OOK mechanism. The base station may identify the terminal that has transmitted the SR signal based on the SR resources on which the SR signal transmitted by the terminal is received. In the case where the multi-bit SR configuration scheme is applied along with the multiple SR configuration scheme, the terminal may send the base station the information necessary for SR on the allocated SR resources. The information necessary for the SR may include at least one of a terminal ID, a data ID, a data priority, a data transmission amount, and a data-related latency requirement. The base station may perform scheduling on the terminal based on the information necessary for SR that is transmitted by the terminal.

Figure 4:
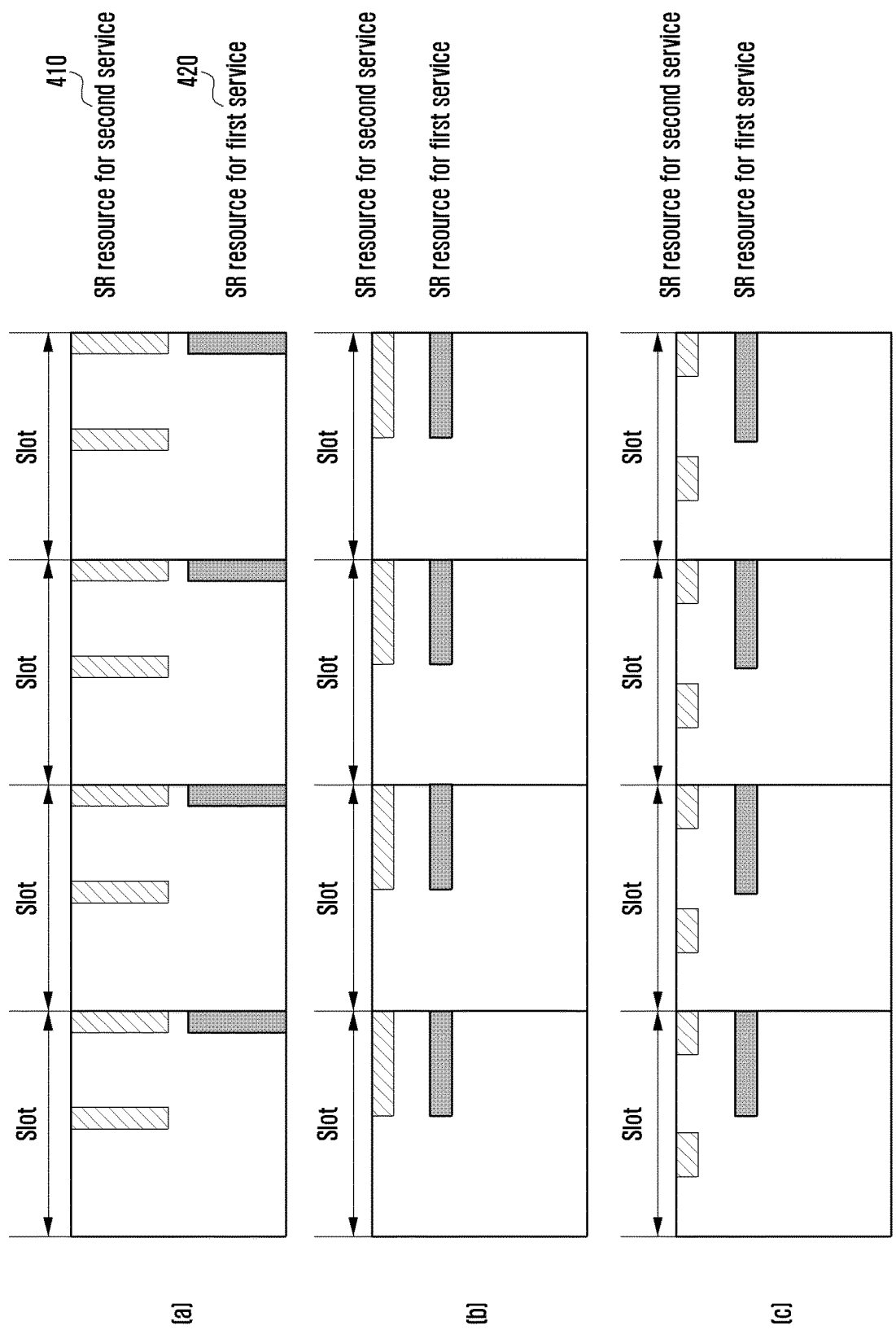
FIG. 4 is a diagram illustrating an SR resource configuration method, according to an embodiment.

FIG. 4 is a diagram illustrating an SR resource configuration method, according to an embodiment. In parts (a), (b), and (c) of FIG. 4, the service-specific (numerology-specific) SR resources are configured to have different frequency resources.

According to an embodiment, the SR resources configured for the first and second services (or numerologies) may be distinguished from each other by their frequency resources. Although FIG. 4 depicts the cases where the first service is an OMB service and the second service is a URLLC service, the present disclosure is not limited to this embodiment. As shown in FIG. 4, the SR resources may be configured to have a periodicity of one or more slots. The base station may notify the terminal of the periodicity of allocating SR resources using a higher layer message.

As shown in FIG. 4, the SR resources configured for the first service, as denoted by reference number 420, and the SR resources configured for the second service, as denoted by reference number 410, may be distinguished from each other by their frequency resources and may fall at the same timing. In this embodiment, the terminal may transmit an SR for one of the first and second services, such as an SR for the service with a high reliability constraint, an SR for the service with the data stored in a transmit buffer, and an SR for the service with massive data to be transmitted.

The terminal may also transmit the SRs for both the first and second services. In this case, the terminal may transmit the SRs on the SR resources distinguished from each other in the frequency domain. According to an embodiment, the terminal may transmit the SRs for the first and second services together on one of the SR resources that are respectively configured for the first and second services. In this case, the terminal may configure the SR signals for the first and second services to have different signal power levels, different preambles, or different bit values to distinguish between the two SR signals.

Figure 5:
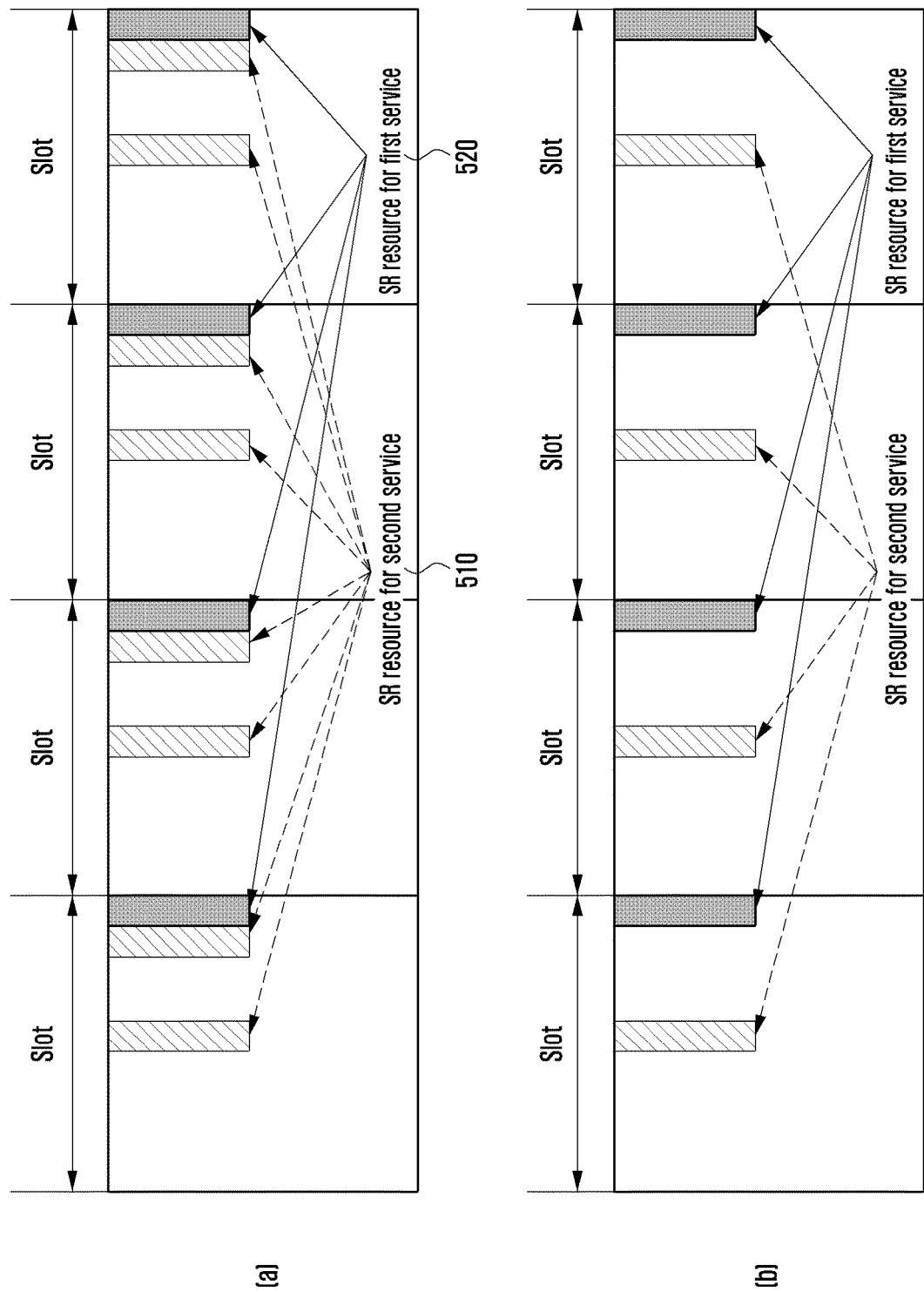
FIG. 5 is a diagram illustrating an SR resource configuration method, according to an embodiment.

FIG. 5 is a diagram illustrating an SR resource configuration method according to an embodiment. In parts (a), (b), and (c) of FIG. 5, the service-specific (numerology-specific) SR resources are configured to have different time resources.

According to an embodiment of the present disclosure, the SR resources configured for the first and second services (or numerologies) may be distinguished from each other by their time resources. Although FIG. 5 depicts the cases where the first service is an eMBB service and the second service is a URLLC service, the present disclosure is not limited to this embodiment. As shown in FIG. 5, the SR resources may be allocated in a unit of a slot, and the periodicity of allocating SR resource may be determined using a high layer message.

Referring to FIG. 5, the SR resources for the first service, as denoted by reference number 520, and the SR resources for the second service, as denoted by reference number 510, may be allocated for a predetermined duration. For example, the SR resources for the URLLC service and the SR resources for the eMBB service may be allocated within a period of consecutive symbols.

In this case, the terminal may transmit, to the base station, the SR for one of the two services. For example, the terminal may transmit the SR for the service with a high reliability constraint, the SR for the service with the data stored in a transmit buffer, or the SR for the service with massive data to be transmitted. It may also be possible for the terminal to transmit the SRs for both the services. For example, the terminal may transmit the SRs over consecutive symbols or the SRs for the two services on one of the two SR resources. In the latter case, the terminal may configure the two SR signals to have different power levels, different preambles, or different bit values to distinguish between the two SR signals.

Figure 6:
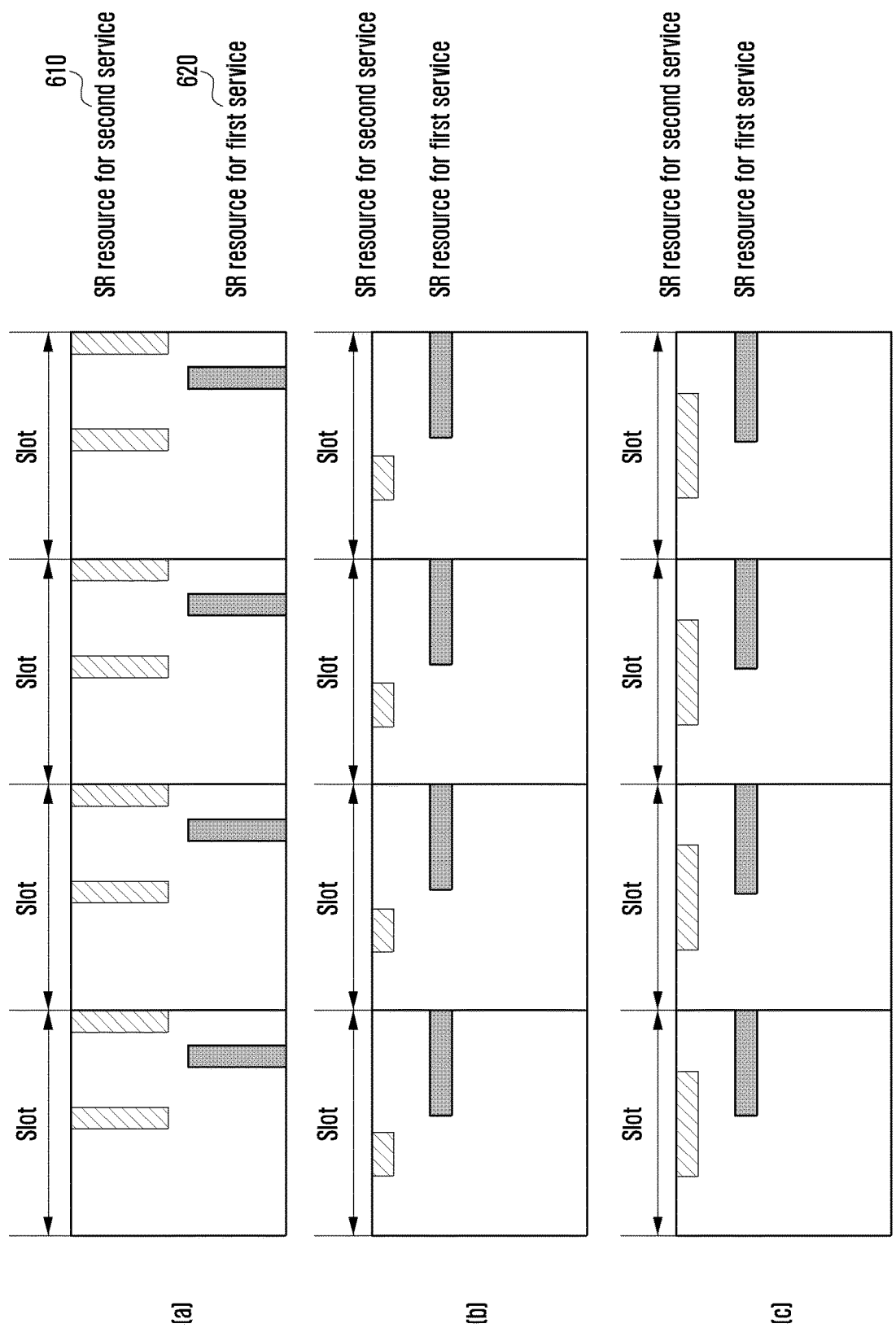
FIG. 6 is a diagram illustrating an SR resource configuration method, according to an embodiment.

FIG. 6 is a diagram illustrating an SR resource configuration method according to an embodiment. In parts (a), (b), and (c) of FIG. 6, the service-specific (numerology-specific) SR resources are configured to have different frequency resources and different time resources.

According to an embodiment, the SR resources configured for the first service (or numerology/TTI) and the SR resources configured for the second service (or numerology/TTI) may be distinguished from each other by their time resources and frequency resources. Although FIG. 6 depicts the cases where the first service is an eMBB service and the second service is a URLLC service, the present disclosure is not limited to this embodiment. As shown in FIG. 6, the SR resources may be allocated by slot, and SR resources periodicities may be determined using a high layer message.

Referring to FIG. 6, the SR resources for the first service, as denoted by reference number 620, and the SR resources for the second service, as denoted by reference number 610, may be allocated for a predetermined duration. That is, the SR resources for the URLLC service and the SR resources for the eMBB service may be allocated within a period of consecutive symbols.

In this case, the terminal may transmit, to the base station, the SR for one of the two services. For example, the terminal may transmit the SR for the service with a high reliability constraint, the SR for the service with the data stored in a transmit buffer, or the SR for the service with massive data to be transmitted. It may also be possible for the terminal to transmit the SRs for both the services. For example, the terminal may transmit the SRs over consecutive symbols or the SRs for the two services on one of the two SR resources. In the latter case, the terminal may configure the two SR signals to have different power levels, different preambles, or different bit values to distinguish between the two SR signals.

Figure 7:
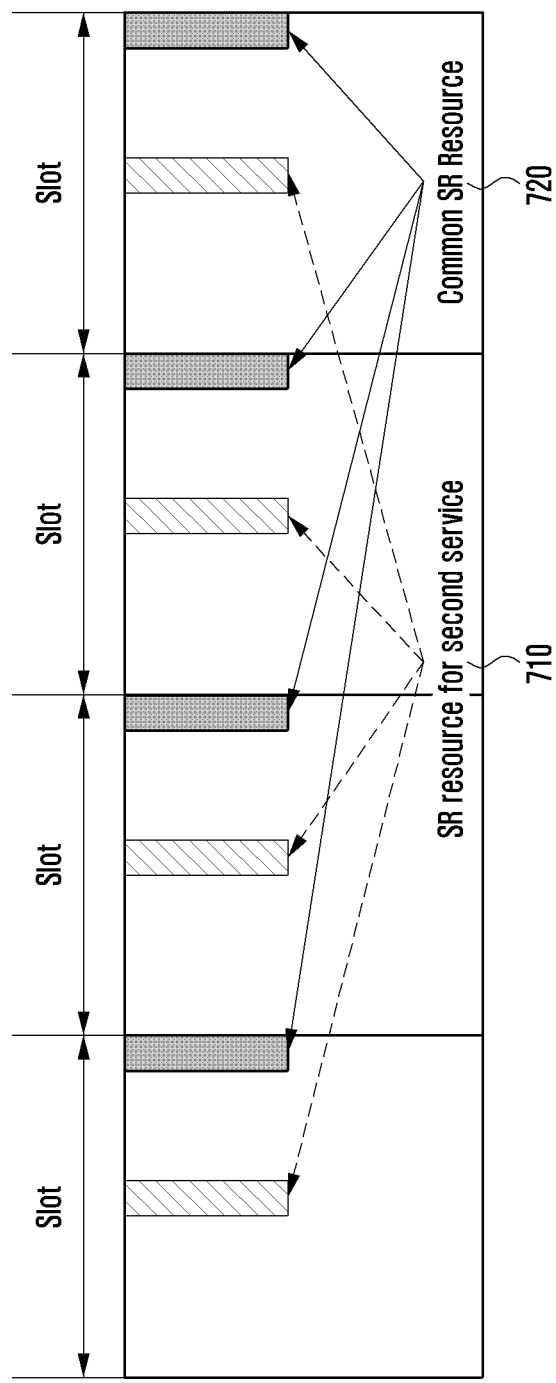
FIG. 7 is a diagram illustrating an SR resource configuration method, according to an embodiment.
Figure 8:
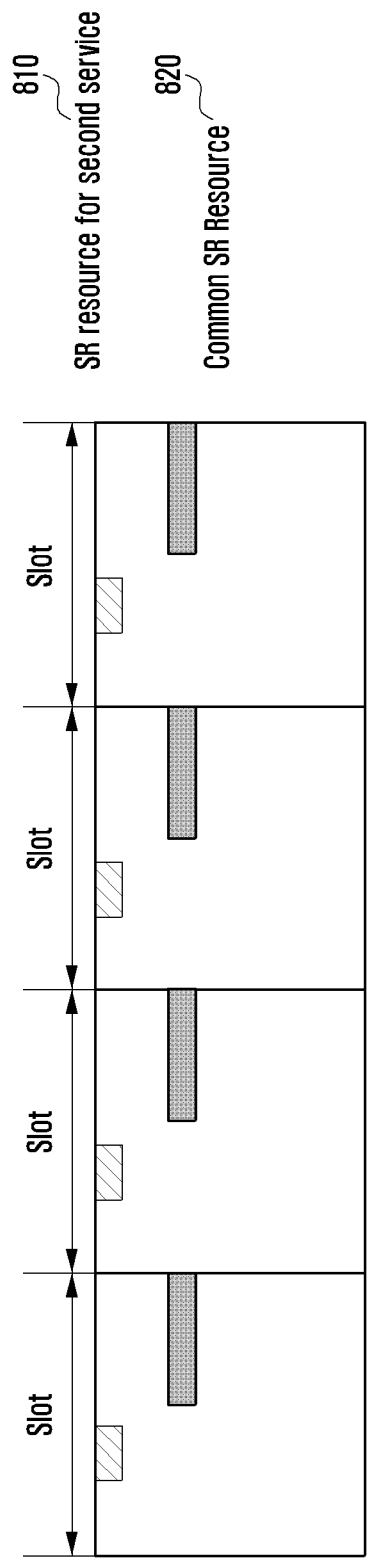
FIG. 8 is a diagram illustrating an SR resource configuration method, according to an embodiment.

FIGS. 7 and 8 depict embodiments of a method for configuring additional SR resources for a low latency service. FIG. 7 is a diagram illustrating an SR resource configuration method, according to an embodiment.

It may be possible to configure additional SR resources for a service with a high latency constraint. A base station may transmit, to a terminal, a higher layer message (e.g., RRC configuration message) to configure SR resources and then another higher layer message to configure additional SR resources. It may also be possible to configure multiple SR resources by transmitting a single higher layer message.

In the following description, a period for transmitting SR signals for one or more services is referred to as common SR resources 720. The terminal transmits, to the terminal, an SR signal to request UL resources as the common resources 720 regardless of the service. The base station may transmit, to the terminal, the allocated SR resources information without service-specific (or numerology/TTI) information. The service-specific (or numerology/TTI) information may include at least one of information for identifying a service (such as eMBB, URLLC, and eMBB), information for determining a numerology/TTI for UL data associated with the SR, information related to a quality of service (QoS) of a logical channel associated with the SR, and information for determining a service (or numerology/TTI) that cannot be transmitted as the UL resources associated with the SR.

The terminal transmits an SR signal on the allocated SR resources in an OOK format. The base station may identify the terminal that has transmitted the SR signal based on the SR resources on which the SR signal transmitted by the terminal is received. According to an embodiment, the terminal may transmit the SR signal including additional information necessary for an SR on the allocated SR resources. The additional information necessary for an SR may include at least one of a terminal ID, a data ID, a data priority, a data transmission amount, and a data-related latency requirement. The base station may schedule the UL transmission of the terminal based on the additional information included in the received SR signal.

According to an embodiment, the common SR resource 720 configured for common use by multiple services (or numerologies), and the SR resources 710 additionally configured for the second service (or numerology) with a high latency constraint may be distinguished by their time resources. Assuming that the second service is a URLLC service in FIG. 7, the terminal may transmit the SR signals for both the eMBB and URLLC services on the common SR resources 720. The terminal may also transmit the SR signal for the second service on the SR resources 710 that have been additionally allocated for the second service. The SR resource may be allocated in unit of a slot, and the SR resource periodicities may be determined using a high layer message.

FIG. 8 is a diagram illustrating an SR resource configuration method, according to an embodiment.

According to an embodiment, common SR resources 820 configured for common use by multiple services (or numerologies) and SR resources 810 additionally configured for the second service with a high latency constraint may be distinguished by their frequency resources. Assuming that the second service is a URLLC service in FIG. 8, the terminal may transmit the SR signals for both the eMBB and URLLC services on the common SR resources 820. The terminal may also transmit the SR signal for the second service on the SR resources 810 that have been additionally allocated for the second service. The SR resource may be allocated in unit of a slot, and the SR resource periodicities may be determined using a high layer message.

The above description, with reference to FIGS. 4-8, is with regards to the multiple SR configuration procedures.

The following description, with reference to FIGS. 9-16, is with regards to multiple SR configuration-based terminal operations.

FIG. 9 is a diagram illustrating a UL grant resource configuration method, according to an embodiment.

After transmitting an SR signal, a terminal may receive a UL grant from a base station via DCI of PDCCH. The terminal may perform UL data transmission based on the information contained in the received UL grant, which may include at least one of UL transmission resources information and hybrid automatic repeat request (HARQ) process information. According to an embodiment, the UL grant may include at least one of information for identifying a service (such as eMBB, URLLC, and eMBB), information for determining a numerology/TTI for UL data associated with the SR, information related to a QoS of a logical channel associated with the SR, and information for determining a service (or numerology/TTI) that cannot be transmitted on the UL resources associated with the SR.

In the case that a multiple SR configuration is applied, the UL grant transmission timings (i.e., timing of a DL control signal) corresponding to the individual SRs may be determined as specified in a standard document. The timing may be set to an absolute value such as 1 ms and 4 ms, or by the slot or subframe as a time unit defined based on subcarrier spacing (SCS). The timing may be determined based on a metric defined per network or specified in the standard document (e.g., numerology and SCS of synchronization block).

The DL control signal timings for transmitting the UL grants in response to the individual SRs may be determined using a high layer message (e.g., RRC configuration message). The DL control signal timings may also be determined based on the timings or absolute values defined using a higher layer message or by the time unit determined according to predetermined numerologies.

The DL control signal timings for transmitting the UL grants in response to the individual SRs may be determined dynamically based on a physical channel control message (e.g., DCI). The DL control signal timings may also be determined based on the timings or absolute values defined via a logical channel control message or by the time unit determined according to predetermined numerologies.

In the case where two or more SR resources are configured for a terminal, the terminal has to distinguish among the SRs. Hereinafter, the methods for a terminal to distinguish among the individual SRs are described, according to various embodiments.

According to an embodiment, a UL grant may include an ID of a specific service numerology/TTI). If a service ID is included in the UL grant received in response to an SR transmitted using the SR resources allocated for a specific service, the terminal may identify the SR corresponding to the received UL grant. The terminal may ascertain the service ID from the high layer message received for SR resource configuration.

According to an embodiment, the UL grant may include information related to the QoS of the logical channel associated with the SR. If the terminal receives the QoS-related information, it may transmit UL data service using a numerology/TTI mapped to the corresponding QoS. According to an embodiment, the UL grant may include information indicating a service (or numerology/TTI) that cannot be transmitted on the UL resources associated with the SR. If the terminal receives the information indicating a service (or numerology/TTI) that cannot be transmitted on the UL resources associated with the SR, it may transmit UL data of the services with the exception of the service indicated by the received information.

According to an embodiment, the UL grant may be identified based on the resources on which the SR is transmitted. That is, the terminal may associate individual services with SR resources and distinguish among UL grants based on the corresponding resources. For example, the terminal may receive a UL grant at a resource region associated with the frequency part of the SR resources on which the terminal has transmitted the corresponding SR. The information on the relationship between the frequency parts and the resources on which the UL grant is received may be delivered to the terminal using a high layer message or determined according to a predetermined standard (e.g., as specified in a standard document). The terminal may receive the UL grant under the assumption that the UL grant corresponding to an SR is transmitted in the same frequency part as the resources on which the SR has been transmitted.

Referring to FIG. 9, the resources on which the UL grants corresponding to the SRs for different received services may be distinguished by their frequency resources. For example, in parts (a), (b), and (c) of FIG. 9, the UL grant corresponding to the SR for a URLLC service (second service in FIG. 9) that is transmitted in the resource region 910 is received in the first region in part (a) 930, the first region in part (b) 950, and the first region in part (c) 970, and the UL grant corresponding to the SR for the eMBB service (first service in FIG. 9) that is transmitted in the resource region 920 is received in the second region in part (a) 940, the second resource in part (b) 960, and the second resource in part (c) 980. The first and second regions in which the UL grants for different services are received may be distinguished by their frequency resources, and the present disclosure may include embodiments in which the UL grants for the different services are transmitted at different timings as well as the embodiments in which the UL grants for the different services are transmitted at the same timing as shown in FIG. 9. The UL grants for the two different services may also be transmitted over consecutive resource regions as shown in the drawing or non-consecutive resource regions in the frequency domain.

The UL grant resource configuration method, according to the embodiment illustrated in FIG. 9, may be applied in combination with any of the multi-SR resource configuration methods according to the embodiments illustrated in FIGS. 4-8 (e.g., embodiments in which the SR resources for different services are distinguished by their frequency and/or time resources or additional SR resources are configured).

FIG. 10 is a diagram illustrating a UL grant resource configuration method, according to an embodiment.

Referring to FIG. 10, the resources on which the UL grants corresponding to the SRs for different received services may be distinguished by their time resources. For example, in parts (a), (b), and (c) of FIG. 10, the UL grant corresponding to the SR for the URLLC service (second service in FIG. 10) that is transmitted in the resource region 1010 is received in the first region in part (a) 1030, the first region in part (b) 1050, and the first region in part (c) 1070, and the UL grant corresponding to the SR for the eMBB service (first service in FIG. 10) that is transmitted in the resource region 1020 is received in the second region in part (a) 1040, the second region in part (b) 1060, and the second region in part (c) 1080. The first and second regions in which the UL grants for different services are received may be distinguished by their time resources, and the present disclosure may include embodiments in which the UL grants for the different services are transmitted at the same frequency, as shown in FIG. 10, as well as the embodiments in which the UL grants for the different services are transmitted at different frequencies. The UL grants for the two different services may also be transmitted over consecutive resource regions as shown in FIG. 10, or transmitted over non-consecutive resource regions in the time domain.

The UL grant resource configuration method, according to the embodiment of FIG. 10, may be applied in combination with any of the multi-SR resource configuration methods according to the embodiments illustrated in FIGS. 4-8 (e.g., embodiments in which the SR resources for different services are distinguished by their frequency and/or time resources or additional SR resources are configured).

FIG. 11 is a diagram illustrating a UL grant resource configuration method according to an embodiment.

Referring to FIG. 11, the UL grants are conveyed in mini-slots. Assuming that a slot consists of N symbols, a mini-slot denotes a resource region composed of 2 to N−1 symbols and may be formed at any timing in a slot.

In parts (a), (b), and (c) of FIG. 11, if the first service is an eMBB service and the second service is a URLLC service, the second service may be arranged within the slot carrying the first service in the form of a mini-slot. That is, it may be possible to define time resources (i.e., mini-slot) for transmitting the first service data for an additional terminal or the corresponding terminal in the slot carrying the second service of the additional terminal or the corresponding terminal. If the terminal receives a UL grant in a mini-slot defined within a slot, the terminal may assume that the UL grant received in the mini-slot is the UL grant for the second service.

According to an embodiment, all of the SR resources 1110 for the second service and the resources 1130, 1150, and 1170 for UL grants may fall in the mini-slots 1135, 1155, and 1175. According to an embodiment, only the resources 1130, 1150, and 1170 on which the UL grant for the second service is received are included in the mini-slots 1135, 1155, and 1175. According to an embodiment, only the SR resources 1110 for the second service may be included in the mini-slots 1135, 1155, and 1175. The UL grant for the first service may be received in a slot with no mini-slot as denoted by reference numbers 1140, 1160, and 1180.

The UL grant resource configuration method according to the embodiment illustrated in FIG. 11 may be applied in combination with any of the multi-SR resource configuration methods according to the embodiments of FIGS. 4-8 (e.g., embodiments in which the SR resources for different services are distinguished by their frequency and/or time resources or additional SR resources are configured), and parts (a), (b), and (c) of FIG. 11 depict such cases separately.

According to an embodiment of the present disclosure, if the terminal receives a UL grant corresponding to the SR transmitted using the pre-allocated SR resources, it may transmit, to the base station, the data with the highest priority among the UL data to be transmitted regardless of the services associated with the SR resources. That is, the terminal may assume the received UL grant as the UL grant with the highest priority at the corresponding timing and transmit the data of the corresponding service to the base station. The transmission priority of data may be determined based on the type of service (such as URLLC, eMBB, and eMTC services), transmission buffer input timing of data, latency requirement of data, remaining validity time of data, or any combination thereof.

Figure 12:
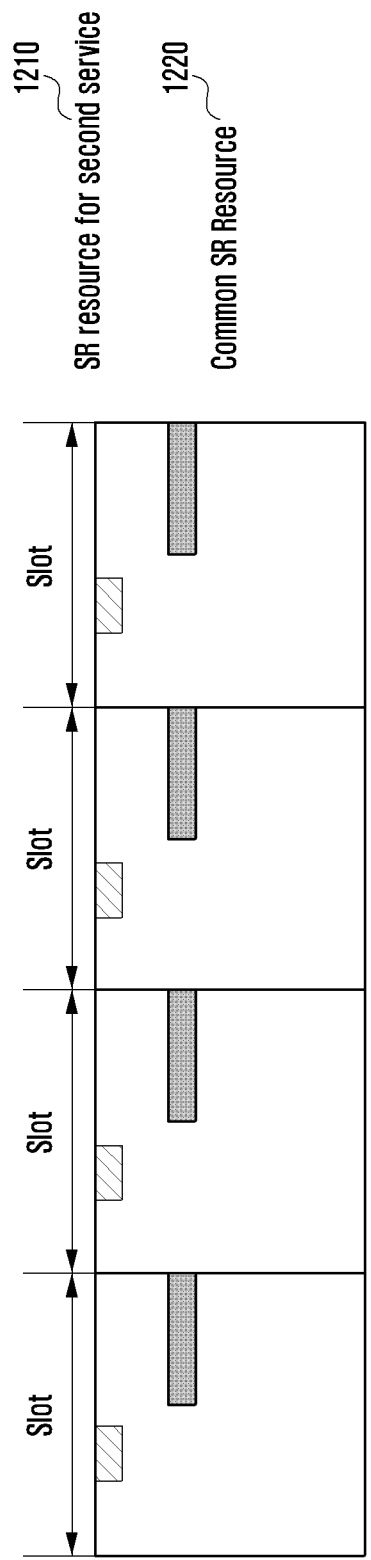
FIG. 12 is a diagram illustrating a UL grant configuration method, according to an embodiment.
Figure 13:
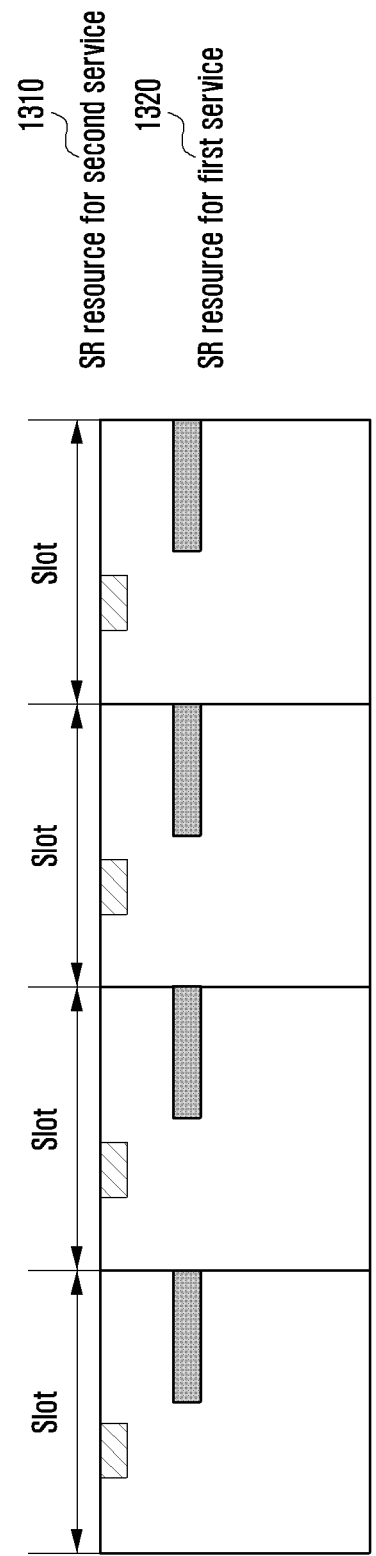
FIG. 13 is diagram illustrating a UL grant configuration method, according to an embodiment.

FIGS. 12 and 13 are diagrams illustrating UL grant configuration methods, according to various embodiments, directed to SR operations based on NOMA.

If a network allocates SR resources for multiple services that are simultaneously active in multiple individual terminals, this may reduce resource utilization efficiency. In order to overcome this problem, it may be necessary to support a NOMA-based SR transmission to allocate SR resources for at least one of the multiple services.

Referring to FIG. 12, the common SR resources 1220 may be dedicatedly allocated to a terminal, and the SR resources 1210 for a URLLC service may be allocated to be shared with other terminals such that the terminal may perform a NOMA-based SR transmission on the URLLC SR resources 1210. A contention-based SR transmission scheme may be considered as an example of the NOMA-based SR transmission. That is, in the case where multiple terminals transmit data on the SR resources 1210, the base station may operate by selecting at least one decoded signal and allocate UL resources to the terminal that has transmitted the selected signal.

Referring to FIG. 13, the SR resources 1320 for an eMBB service (first service in FIG. 13) may be dedicatedly allocated to a terminal, and the resources 1310 for a URLLC service (second service in FIG. 13) may be allocated to be shared with other terminals such that the terminal may perform a NOMA-based SR transmission on the URLLC SR resources 1310, As an example of the NOMA-based SR transmission, the SR scheme aforementioned in the embodiment of FIG. 12 may be considered.

In the NOMA-based SR transmission scheme, the terminal may transmit information necessary for the SR along with the SR signal using predetermined SR resources. The information necessary for the SR may include at least one of a terminal ID, a data ID, a data priority, a data transmission amount, and a data-related latency requirement, and the base station may schedule the terminal based on the received SR signal and the information necessary for the SR.

Operations of a terminal, upon receipt of a UL grant in response to an SR transmitted in a NOMA-based SR transmission scheme described in the embodiments illustrated in FIGS. 12 and 13, are described in detail with reference to FIGS. 14 to 16.

FIG. 14 is a diagram illustrating a UL grant resource configuration method, according to an embodiment.

In the case of using the NOMA-based SR transmission scheme, the base station transmits, to the terminal, a UL grant signal including at least one of a terminal ID, a data ID, and information indicative of a terminal/service. The terminal may identify the terminal and service for which the UL grant is transmitted based on the information included in the received UL grant.

According to an embodiment, the terminal may identify the service for which the UL grant is transmitted based on the service ID included in the UL grant received in response to the SR that the terminal has transmitted on the NOMA-based SR resources. The service ID may be ascertained from a higher layer message transmitted by the base station for configuring SR resources.

According to an embodiment, the terminal may identify the UL grant based on the resources associated with the resources on which the terminal has transmitted the SR in the NOMA-based SR transmission scheme. That is, it may be possible to associate the service-specific SR resources with certain resources such that, when a UL grant is received based on the corresponding resources, the terminal is capable of ascertaining the SR resources associated with the resources on which the UL grant is received.

In parts (a), (b), and (c) of FIG. 14, the SR resources 1410 for a URLLC service are a resource region for a terminal to transmit an SR in the NOMA-based SR transmission scheme. If the terminal receives a UL grant in a resource region in part (a) 1430, a resource region in part (b) 1450, and a resource region in part (c) 1470 associated with the frequency part of the URLLC SR resources 1410 on which the terminal has transmitted the SR, it may identify the service for which the UL grant is transmitted. The relationship between the URLLC SR resources 1410 and the resource region in part (a) 1430, the resource region in part (b) 1450, and the resource region in part (c) 1470 on which the UL grant is transmittable may be delivered to the terminal using a higher layer message or defined in a standard document. It may be possible to consider a simple method in that the terminal operates under the assumption that the UL grant is received on the same frequency resources as that of the resource region on which it has transmitted the SR.

Referring to FIG. 14, the resources on which the UL grants corresponding to the SRs for different received services may be distinguished by their frequency resources. For example, in parts (a), (b), and (c) of FIG. 14, the UL grant corresponding to the SR for the URLLC service (second service in FIG. 14) that is transmitted in the resource region 1410 may be received in the first region in part (a) 1430, the first region in part (b) 1450, and the first region in part (c) 1470, and the UL grant corresponding to the SR for the eMBB service (first service in FIG. 14) that is transmitted in the resource region 1420 may be received in the second region in part (a) 1410, the second region in part (b) 1460, and the second region in part (c) 1480. The first and second regions in which the UL grants for different services are received may be distinguished by their frequency resources and, although FIG. 14 depicts a case where the UL grants for two different services are transmitted at the same time, the present disclosure is not limited to the embodiment of FIG. 14, and it may encompass other embodiments in which the UL grants for different services are transmitted at different times. The UL grants for the two different services may also be transmitted over consecutive resource regions as shown in FIG. 14 or non-consecutive resource regions in the frequency domain.

The UL grant resource configuration method according to the embodiment illustrated in FIG. 14 may be applied in combination with any of the multi-SR resource configuration methods illustrated in the embodiments of FIGS. 4-8 (e.g., embodiments in which the SR resources for different services are distinguished by their frequency and/or time resources or additional SR resources are configured).

FIG. 15 is a diagram illustrating a UL grant resource configuration method, according to an embodiment.

In parts (a), (b), and (c) of FIG. 15, the SR resources 1510 for a URLLC service are a resource region for a terminal to transmit an SR in the NOMA-based SR transmission scheme. If the terminal receives a UL grant in a resource region in part (a) 1530, a resource region in part (b) 1550, and a resource region in part (c) 1570 associated with the frequency part of the URLLC SR resources 1510 on which the terminal has transmitted the SR, it may identify the service for which the UL grant is transmitted. The relationship between the URLLC SR resources 1510 and the resource region in part (a) 1530, the resource region in part (b) 1550, and the resource region in part (c) 1570 on which the UL grant is transmittable may be delivered to the terminal using a higher layer message or defined in a standard document. It may be possible to consider a simple method in that the terminal operates under the assumption that the UL grant is received on the same frequency resources as that of the resource region which transmitted the SR.

Referring to FIG. 15, the resources on which the UL grants corresponding to the SRs for different received services may be distinguished by their time resources. For example, in parts (a), (b), and (c) of FIG. 15, the UL grant corresponding to the SR for the URLLC service (second service in FIG. 15) that is transmitted in the resource region 1510 may be received in the first region in part (a) 1530, the first region in part (b) 1550, and the first region in part (c) 1570, and the UL grant corresponding to the SR for the eMBB service (first service in FIG. 15) that is transmitted in the resource region 1520 may be received in the second region in part (a) 1540, the second region in part (b) 1560, and the second region in part (c) 1580. The first and second regions in which the UL grants for different services are received may be distinguished by their time resources and, although FIG. 15 depicts a case where the UL grants for two different services are transmitted in the same frequency part, the present disclosure is not limited to the embodiment of FIG. 15, and it may encompass other embodiments in which the UL grants for different services are transmitted at different frequency parts. The UL grants for the two different services may also be transmitted over consecutive resource regions as shown in the drawing or non-consecutive resource regions in the time domain.

The UL grant resource configuration method according to the embodiment illustrated in FIG. 15 may be applied in combination with any of the multi-SR resource configuration methods according to the embodiments illustrated in FIGS. 4-8 (e.g., embodiments in which the SR resources for different services are distinguished by their frequency and/or time resources or additional SR resources are configured).

FIG. 16 is a diagram illustrating a UL grant resource configuration method, according to an embodiment.

Referring to FIG. 16, the UL grants are conveyed in mini-slots. Assuming that a slot consists of N symbols, a mini-slot denotes a resource region composed of 2 to N-1 symbols and may be formed at any timing in a slot.

In parts (a), (b), and (c) of FIG. 16, if the first service is an eMBB service and the second service is a URLLC service, the second service may be arranged within the slot carrying the first service in the form of a mini-slot. That is, it may be possible to define time resources (i.e., mini-slot) for transmitting the first service data of another terminal or the corresponding terminal in the slot carrying the second service for an additional terminal or the corresponding terminal. In FIG. 16, the SR resources 1610 for a URLLC service are a resource region for transmitting an SR in a NOMA-based SR transmission scheme. If the terminal receives a UL grant in a mini-slot defined within a slot, it may assume that the UL grant received in the mini-slot is the UL grant for the second service.

According to an embodiment, all of the SR resources 1610 for the second service and the resources 1630, 1650, and 1670 for UL grants may fall in the mini-slot of part (a) 1635, the mini-slot of part (b) 1655, and the mini-slot of part (c) 1675. According to an embodiment, only the resources 1630, 1650, and 1670 on which the UL grant for the second service is received are included in the mini-slot of part (a) 1635, the mini-slot of part (b) 1655, and the mini-slot of part (c) 1675. According to an embodiment, only the SR resources 1610 for the second service may be included in the mini-slot of part (a) 1635, the mini-slot of part (b) 1655, and the mini-slot of part (c) 1675. The UL grant for the first service may be received in a slot with no mini-slot as denoted by reference numbers 1640, 1660, and 1680.

The UL grant resource configuration method according to the embodiment illustrated in FIG. 16 may be applied in combination with any of the multi-SR resource configuration methods according to the embodiments of FIGS. 4-8 (e.g., embodiments in which the SR resources for different services are distinguished by their frequency and/or time resources or additional SR resources are configured), and parts (a), (b), and (c) of FIG. 16 depict such cases separately.

According to an embodiment, if the terminal receives a UL grant corresponding to the SR transmitted using the pre-allocated SR resources or NOMA-based SR resources, it may transmit, to the base station, the data with the highest priority among the UL data to be transmitted regardless of the services mapped to the SR resources. That is, the terminal may assume the received UL grant as the UL grant with the highest priority at the corresponding timing and transmit the data of the corresponding service to the base station. The transmission priority of data may be determined based on the type of service (such as URLLC, eMBB, and eMTC services), transmission buffer input timing of data, latency requirement of data, remaining validity time of data, or any combination thereof.

The UL grant resource configuration methods, according to various embodiments, are characterized by configuring multiple SR resources for different services in order for a terminal to transmit SR signals to a base station on the different SR resources in a service-specific manner. Furthermore, the terminal is capable of identifying the service and/or the SR signal corresponding to the received UL grant.

Each of the above described methods may be understood as a procedure of predefining resource regions for receiving UL grants for different services and may interpret a UL grant (i.e., a response to an SR) received in one of the predefined resource regions as the UL grant for a specific service being identified by the resource region on which the UL grant is received. That is, each of the above described methods may be understood as a procedure of interpreting the mapping relationship between multiple services that are available in a terminal and the UL grants. Also, each of the above described methods may be understood as a procedure for a terminal to receive a UL grant and determine a buffer for which a BSR is transmitted to the base station.

Figure 17:
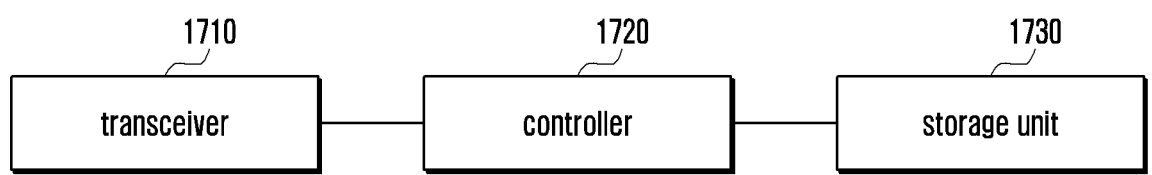
FIG. 17 is a block diagram illustrating a configuration of a terminal, according to an embodiment.

FIG. 17 is a block diagram illustrating a configuration of a terminal, according to an embodiment.

Referring to FIG. 17, the terminal may include a transceiver 1710, a controller 1720, and a storage unit 1730. In this embodiment, the controller 1720 may be defined as a circuit, an ASIC, or at least one processor.

The transceiver 1710 may transmit and receive signals to and from other network entities. For example, the transceiver 1710 may transmit an SR to a base station and receive a UL grant from the base station. The transceiver 1710 may be implemented in the form of a radio frequency (RF) unit including a modem.

The controller 1720 may control overall operations of the terminal, according to an embodiment. For example, the controller 1720 may control the transceiver 1710 and the storage unit 1730 to perform the operations described with reference to the accompanying drawings in the above embodiments. In detail, the controller 1720 may determine a resource region for transmitting an SR and a service corresponding to a received UL grant.

The storage unit 1730 may store at least one of the information being transmitted and received by the transceiver 1710 and the information generated by the controller 1720.

Figure 18:
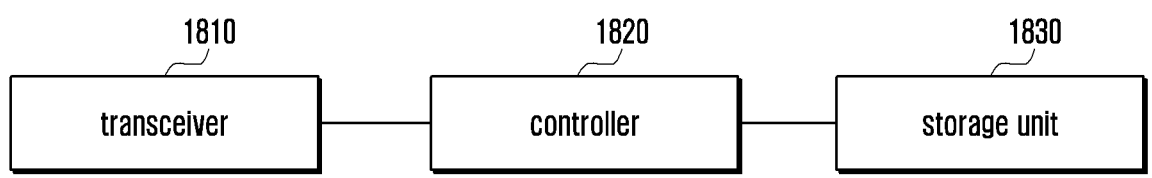
FIG. 18 is a block diagram illustrating a configuration of a base station, according to an embodiment.

FIG. 18 is a block diagram illustrating a configuration of a base station, according to an embodiment.

Referring to FIG. 18, the base station may include a transceiver 1810, a controller 1820, and a storage unit 1830. In this embodiment, the controller 1820 may be defined as a circuit, an ASIC, or at least one processor.

The transceiver 1810 may transmit and receive signals to and from other network entities. For example, the transceiver 1810 may transmit system information, synchronization signals, and reference signals to a terminal. The transceiver 1810 may be implemented in the form of an RF unit including a modem.

The controller 1820 may control overall operations of the base station, according to an embodiment. For example, the controller 1820 may control the transceiver 1810 and the storage unit 1830 to perform the operations described with reference to the accompanying drawings in the above embodiments. In detail, the controller 1820 may schedule UL transmission of the terminal based on the SR received from the terminal and transmit a UL grant to the terminal.

The storage unit 1830 may store at least one of the information being transmitted and received by the transceiver 1810 and the information generated by the controller 1820.

As described above, the multiple SR configuration method and apparatus of the present disclosure is advantageous in terms of improving the efficiency of a procedure for a terminal to receive uplink grants from a base station, transmit uplink signals to the base station, and protect against malfunction of the terminal in the procedure.

The multi-bit SR configuration method of the present disclosure is advantageous in terms of making it possible for a terminal to transmit information additionally required for an uplink transmission to a base station.

While this disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of a terminal in a mobile communication system, the method comprising:
   receiving, from a base station, information including first scheduling request (SR) configurations and an allowed subcarrier spacing (SCS) corresponding to a first logical channel, and second SR configurations and an allowed SCS corresponding to a second logical channel;

transmitting, to the base station, an SR based on the first SR configurations corresponding to the first logical channel and the second SR configurations corresponding to the second logical channel;

receiving, from the base station, an uplink grant in response to the SR;

identifying an SCS associated with a bandwidth part (BWP) including the uplink grant; and selecting a logical channel between the first logical channel and the second logical channel such that the identified SCS associated with the BWP is matched to the allowed SCS included in the information.

2. The method of claim 1, further comprising transmitting, to the base station, uplink data from the selected logical channel.

3. The method of claim 2, wherein transmitting the uplink data comprises transmitting the uplink data based on information included in the first and second SR configurations, and wherein the information included in the first and second SR configurations comprises at least one of information for identifying individual services in association with SR resources, information for determining a numerology or a transmission time interval (TTI) of uplink data for the individual services, information related to quality of service (QoS) of logical channels associated with the individual services, and information for determining services that are not transmittable based on a resource on which the uplink grant corresponding to the SR is received.

4. The method of claim 1, wherein the first logical channel for a first service and the second logical channel for a second service are different from each other in at least one of numerology, a transmission time interval (TTI), and a latency requirement.

5. A terminal of a mobile communication system, the terminal comprising:

a transceiver configured to transmit and receive a signal; and a controller configured to:

receive, from a base station, information including first scheduling request (SR) configurations and an allowed subcarrier spacing (SCS) corresponding to a first logical channel, and second SR configurations and an allowed SCS corresponding to a second logical channel, transmit, to the base station, an SR based on the first SR configurations corresponding to the first logical channel and the second SR configurations corresponding to the second logical channel, receive, from the base station, an uplink grant in response to the SR, identify an SCS associated with a bandwidth part (BWP) including the uplink grant, and select a logical channel between the first logical channel and the second logical channel such that the identified SCS associated to the BWP is matched with the allowed SCS included in the information.

6. The terminal of claim 5, wherein the controller is further configured to transmit uplink data from the selected logical channel to the base station.

7. The terminal of claim 6, wherein the controller is further configured to transmit the uplink data based on information included in the first and second SR configurations, and wherein the information included in the first and second SR configurations comprises at least one of information for identifying individual services in association with SR resources, information for determining a numerology or a transmission time interval (TTI) of uplink data for the individual services, information related to a quality of service (QoS) of logical channels associated with the individual services, and information for determining services that are not transmittable based on a resource on which the uplink grant corresponding to the SR is received.

8. The terminal of claim 5, wherein the first logical channel for a first service and the second logical channel for a second services are different from each other in at least one of numerology, a transmission time interval (TTI), and a latency requirement.

9. A method of a base station in a mobile communication system, the method comprising:

transmitting, to a terminal, information including first scheduling request (SR) configurations and an allowed subcarrier spacing (SCS) corresponding to a first logical channel, and second SR configurations and an allowed SCS corresponding to a second logical channel;

receiving, from the terminal, a scheduling request (SR) based on the first SR configurations corresponding to the first logical channel and the second SR configurations corresponding to the second logical channel; and transmitting, to the terminal, an uplink grant for a first service and a second service in response to the SR, wherein an SCS associated with a bandwidth part (BWP) including the uplink grant is identified by the terminal, and wherein a logical channel between the first logical channel and the second logical channel is selected by the terminal such that the identified SCS associated with the BWP is matched with the allowed SCS included in the information.

10. The method of claim 9, further comprising receiving the uplink data from the selected logical channel.

11. The method of claim 10, wherein receiving the uplink data comprises receiving the uplink data based on information included in the first and second SR configurations, and wherein the information included in the first and second SR configurations comprises at least one of information for identifying individual services in association with SR resources, information for determining a numerology or a transmission time interval (TTI) of uplink data for the individual services, information related to a quality of service (QoS) of logical channels associated with the individual services, and information for determining services that are not transmittable based on a resource on which the uplink grant corresponding to the SR is received.

12. The method of claim 9, wherein the first logical channel for a first service and the second logical channel for a second service are different from each other in at least one of numerology, a transmission time interval (TTI), and a latency requirement.

13. A base station of a mobile communication system, the base station comprising:

a transceiver configured to transmit and receive a signal; and a controller configured to:

transmit, to a terminal, information including first scheduling request (SR) configurations and an allowed subcarrier spacing (SCS) corresponding to a first logical channel, and second SR configurations and an allowed SCS corresponding to a second logical channel, receive, from the terminal, an SR based on the first SR configurations corresponding to the first logical channel and the second SR configurations corresponding to the second logical channel, and transmit to the terminal an uplink grant for a first service and a second service in response to the SR, wherein an SCS associated with a bandwidth part (BWP) including the uplink grant is identified by the terminal, and wherein a logical channel between the first logical channel and the second logical channel is selected by the terminal such that the identified SCS associated with the BWP is matched with the allowed SCS included in the information.

14. The base station of claim 13, wherein the controller is further configured to receive the uplink data from the selected logical channel.

15. The base station of claim 14, wherein the controller is further configured to receive the uplink data based on information included in the first and second SR configurations, and wherein the information included in the first and second SR configurations comprises at least one of information for identifying individual services in association with SR resources, information for determining a numerology or a transmission time interval (TTI) of uplink data for the individual services, information related to a quality of service (QoS) of logical channels associated with the individual services, and information for determining services that are not transmittable based on a resource on which the uplink grant corresponding to the SR is received.

16. The base station of claim 13, wherein the first logical channel for a first service and the second logical channel for a second service are different from each other in at least one of numerology, a transmission time interval (TTI), and a latency requirement.

* * * * *